(12) United States Patent
Li et al.

(10) Patent No.: US 7,554,775 B2
(45) Date of Patent: Jun. 30, 2009

(54) GMR SENSORS WITH STRONGLY PINNING AND PINNED LAYERS

(75) Inventors: Jinshan Li, San Jose, CA (US); Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 284 days.

(21) Appl. No.: 11/069,306

(22) Filed: Feb. 28, 2005

(65) Prior Publication Data

US 2006/0193089 A1    Aug. 31, 2006

(51) Int. Cl.
*G11B 5/39* (2006.01)
(52) U.S. Cl. ................................. 360/324.11
(58) Field of Classification Search ................ 360/324, 360/324.1, 324.11, 324.12; 428/800, 810, 428/811, 811.2, 813, 814
See application file for complete search history.

(56) References Cited

U.S. PATENT DOCUMENTS

| | | | |
|---|---|---|---|
| 5,583,725 A | | 12/1996 | Coffey et al. |
| 5,701,223 A | * | 12/1997 | Fontana et al. ......... 360/324.11 |
| 5,731,936 A | | 3/1998 | Lee et al. |
| 5,742,162 A | * | 4/1998 | Nepela et al. ............ 324/252 |
| 5,793,279 A | | 8/1998 | Nepela |
| 5,843,589 A | | 12/1998 | Hoshiya et al. |
| 5,880,913 A | * | 3/1999 | Gill ....................... 360/324.11 |
| 5,898,549 A | * | 4/1999 | Gill ....................... 360/324.11 |
| 6,046,892 A | * | 4/2000 | Aoshima et al. ........ 360/324.11 |
| 6,117,569 A | * | 9/2000 | Lin et al. ................ 428/811.2 |
| 6,141,191 A | | 10/2000 | Lee et al. |
| 6,157,525 A | | 12/2000 | Iwasaki et al. |
| 6,208,492 B1 | * | 3/2001 | Pinarbasi ................ 360/324.11 |
| 6,222,707 B1 | | 4/2001 | Huai et al. |
| 6,256,863 B1 | * | 7/2001 | Saito et al. ................ 29/603.08 |
| 6,278,592 B1 | * | 8/2001 | Xue et al. ................ 360/324.12 |
| 6,292,336 B1 | | 9/2001 | Horng et al. |
| 6,407,890 B1 | * | 6/2002 | Gill .......................... 360/314 |

(Continued)

FOREIGN PATENT DOCUMENTS

WO    WO00/65578 A1    11/2000

(Continued)

OTHER PUBLICATIONS

High-Pinning Iridium-Manganese-Chromium (IrMnCr) Read Sensors for High Relaiability & Stability; Hitachi GST; 2006.*

*Primary Examiner*—Brian E Miller
(74) *Attorney, Agent, or Firm*—Zilka-Kotab, PC

(57) ABSTRACT

A giant magnetoresistance (GMR) sensor with strongly pinning and pinned layers is described for magnetic recording at ultrahigh densities. The pinning layer is an antiferromagnetic (AFM) iridium-manganese-chromium (Ir—Mn—Cr) film having a Mn content of approximately from 70 to 80 atomic percent and having a Cr content of approximately from 1 to 10 atomic percent. The first pinned layer is preferably a ferromagnetic Co—Fe having an Fe content of approximately from 20 to 80 at % and having high, positive saturation magnetostriction. The second pinned layer is preferably a ferromagnetic Co—Fe having an Fe content of approximately from 0 to 10 atomic percent. The net magnetic moment of the first and second pinned layers is designed to be nearly zero in order to achieve a pinning field of beyond 3,000 Oe.

8 Claims, 14 Drawing Sheets

U.S. PATENT DOCUMENTS

| | | | |
|---|---|---|---|
| 6,411,476 B1 * | 6/2002 | Lin et al. | 360/324.11 |
| 6,430,014 B1 * | 8/2002 | Gill | 360/324.12 |
| 6,452,763 B1 * | 9/2002 | Gill | 360/324.11 |
| 6,473,275 B1 | 10/2002 | Gill | |
| 6,498,707 B1 * | 12/2002 | Gao et al. | 360/324.11 |
| 6,501,626 B1 * | 12/2002 | Gill | 360/324.11 |
| 6,549,382 B1 * | 4/2003 | Gill | 360/324.11 |
| 7,035,059 B2 * | 4/2006 | Gill | 360/324.11 |
| 7,209,329 B2 * | 4/2007 | Gill et al. | 360/324.2 |
| 7,242,556 B2 * | 7/2007 | Gill | 360/324.12 |
| 7,382,574 B2 * | 6/2008 | Li et al. | 360/125.08 |
| 2003/0030944 A1 * | 2/2003 | Lin et al. | 360/324.1 |
| 2003/0031894 A1 * | 2/2003 | Lin et al. | 428/693 |
| 2003/0035253 A1 * | 2/2003 | Lin et al. | 360/324 |
| 2003/0053270 A1 * | 3/2003 | Gill | 360/324.11 |
| 2004/0042130 A1 * | 3/2004 | Lin et al. | 360/324.12 |
| 2004/0091743 A1 * | 5/2004 | Kula et al. | 428/692 |
| 2004/0105193 A1 * | 6/2004 | Horng et al. | 360/324.11 |
| 2004/0165320 A1 * | 8/2004 | Carey et al. | 360/324.11 |
| 2005/0170532 A1 * | 8/2005 | Horng et al. | 438/3 |
| 2006/0044708 A1 * | 3/2006 | Gill | 360/324.12 |
| 2006/0119981 A1 * | 6/2006 | Li et al. | 360/125 |
| 2006/0168797 A1 * | 8/2006 | Li et al. | 29/603.07 |
| 2006/0193089 A1 * | 8/2006 | Li et al. | 360/324.11 |
| 2007/0171694 A1 * | 7/2007 | Huai et al. | 365/145 |
| 2008/0032159 A1 * | 2/2008 | Gill | 428/811.2 |

FOREIGN PATENT DOCUMENTS

| | | | |
|---|---|---|---|
| WO | WO03/065024 A2 | 7/2003 | |

\* cited by examiner

1

GMR SENSORS WITH STRONGLY PINNING AND PINNED LAYERS

RELATED APPLICATION

An application entitled "Method of Fabricating Magnetic Sensors with Pinned Layers with Zero Net Magnetic Moment" was filed on Jan. 31, 2005 and has been assigned Ser. No. 11/048259. The prior application describes a method to achieve zero net magnetic moment which can be used with the invention described in this application. This referenced application is hereby incorporated by reference in its entirety. The present application is a continuation-in-part of the earlier application.

FIELD OF THE INVENTION

The invention relates to the field of magnetic transducers (heads) used for longitudinal recording in data storage systems, and more particularly to giant magnetoresistance (GMR) sensors used in the magnetic transducers, and even more particularly to the materials and structures of the GMR sensors used to strongly pin magnetizations of pinned layers.

BACKGROUND OF THE INVENTION

A typical prior art data storage system 10 used for longitudinal recording is illustrated in FIG. 1. In operation a magnetic transducer 20 is supported by a suspension (not shown) as it flies above a rotating magnetic disk 16. The magnetic transducer 20, usually called a "head" or "slider," is composed of an element that performs the task of writing magnetic transitions (the write head 23) in ferromagnetic material on the magnetic disk, and another element that performs the task of reading the magnetic transitions (the read head 12) written in the ferromagnetic material on the magnetic disk. The magnetic transducer 20 is positioned by an actuator (not shown) over points at varying radial distances from the center of the magnetic disk 16 to read and write circular tracks (not shown). The magnetic disk 16 is attached to a spindle (not shown) driven by a spindle motor (not shown) to rotate the magnetic disk 16. The magnetic disk 16 comprises a substrate 26 on which a plurality of thin films 21 are deposited. The thin films 21 include ferromagnetic material in which the write head 23 writes the magnetic transitions, and in which the read head 12 reads the magnetic transitions.

There are three main categories of read heads 12, one current-in-plane (CIP) giant magnetoresistance (GMR) heads, one current-perpendicular-to-plane (CPP) GMR heads, and the other CPP tunneling magnetoresistance (TMR) heads. In each category, there are three types of read heads 12, one a top type, one a bottom type, and the other a dual type. A typical prior art top-type CIP GMR read head 12, as illustrated in FIG. 2, includes a bottom shield layer 38, a bottom gap layer 37, a top gap layer 41, and a top shield layer 39. Within the top and bottom read gap layers 37, 41, a top-type CIP GMR sensor 14 is located in a central read region, and hard-bias/lead layers 42, 43 are disposed in two side regions.

The top-type CIP GMR sensor 14, as shown in FIG. 2, comprises a nonmagnetic seed layer 31, a ferromagnetic free (sense) layer 32, an electrically conducting spacer layer 33, a ferromagnetic pinned (reference) layer 34, an antiferromagnetic pinning layer 35, and a nonmagnetic cap layer 36. GMR effects result from different magnetization orientations of the weakly coupled ferromagnetic free and pinned layers 32, 34 separated by the electrically conducting nonmagnetic spacer layer 33. The antiferromagnetic pinning layer 35 fixes the magnetization of the pinned layer 34 in a direction perpendicular to an air bearing surface (ABS) which is an exposed surface of the GMR sensor that faces the magnetic disk (the plane of the paper in FIG. 2). In a quiescent position when a sense current is conducted through the GMR sensor 14 without magnetic field signals from an adjacent rotating magnetic disk 16, the magnetization of the free layer is preferably parallel to the ABS. During GMR sensor operation with magnetic field signals from the adjacent rotating magnetic disk 16, the magnetization of the free layer is free to rotate in positive and negative directions from the quiescent position in response to positive and negative magnetic signal fields from the moving magnetic disk 16.

In the fabrication process of the top-type CIP GMR head 12, the top-type CIP GMR sensor 14 is deposited on the bottom gap layer 37 which is deposited on the bottom shield layer 38. The GMR sensor 14 typically comprises a Ta seed layer 31, Ni—Fe/Co—Fe ferromagnetic free layers 32, a Cu spacer layer 33, a Co—Fe pinned layer 34, an antiferromagnetic Ir—Mn, Pt—Mn or Ni—Mn pinning layer 35, and a Ta cap layer 36.

Photolithographic patterning and ion milling are applied to define the read region of the GMR sensor 14. The hard-bias/leads layers 42 and 43 are then deposited in the two side regions of the GMR sensor. The hard-bias/lead layers 42, 43 preferably comprise a Cr film, a ferromagnetic Co—Pt—Cr film, a Cr film, a Rh film, and a Ta film. An electrically insulating nonmagnetic top gap layer 41 is deposited over the cap layer 36 and hard bias/leads layers 42, 43. A top shield layer 39 is formed over the nonmagnetic top gap layer 41.

In this top-type CIP GMR sensor, ferromagnetic/antiferromagnetic coupling occurs between the pinned and pinning layers, producing a unidirectional anisotropy field ($H_{UA}$). This $H_{UA}$ must be high enough to rigidly pin the magnetization of the pinned layer ($M_2$) in a transverse direction perpendicular to an air bearing surface (ABS) for proper sensor operation. Ferromagnetic/ferromagnetic coupling also occurs across the spacer layer, producing a ferromagnetic coupling field ($H_F$). This $H_F$ must be precisely controlled so that the sum of $H_F$ and a current-induced field ($H_I$) counterbalances a demagnetizing field ($H_D$) in the sense layer ($H_F + H_I = H_D$), thereby orienting the magnetization of the sense layers ($M_1$) in a longitudinal direction parallel to the ABS for optimally biased sensor operation. In a quiescent state, this GMR sensor exhibits a resistance of $R_O + R_A + (1/2)R_G$, where $R_O$ is a nonmagnetic resistance, $R_A$ is the maximum anisotropy magnetoresistance (AMR) of the free layers, and $R_G$ is the maximum giant magnetoresistance (GMR). When receiving a signal field from a magnetic disk, $M_1$ rotates while $M_2$ remains unchanged. This $M_1$ rotation changes the resistance of the GMR sensor by $\pm \Delta R_G \sin \theta_1 - \Delta R_A \sin^2 \theta_1$, where $\theta_1$ is the angle of $M_1$ rotation from the longitudinal direction.

When the GMR sensor is operating at elevated temperatures in the data storage system, an inadequate exchange coupling can cause canting of the magnetization of the pinned layer from the preferred transverse direction, causing malfunction of the sensor operation. The operation temperature of the GMR sensor in the data storage system can reach 180 degrees C. or more. A high $H_{UA}$ at high temperatures ensures proper sensor operation at high temperatures. This thermal stability is typically described by a blocking temperature ($T_B$), where the ferromagnetic/antiferromagnetic exchange coupling diminishes and $H_{UA}$ is zero. A higher $T_B$ typically indicates a higher $H_{UA}$ at the sensor operation temperature.

The effort to increase the GMR coefficient, $H_{UA}$ and $T_B$ is typically directed to the selection of ferromagnetic and antiferromagnetic films from various alloy systems as pinned and pinning layers. Recently, a ferromagnetic 90Co-10Fe alloy film (in atomic percent) has replaced a ferromagnetic Co film as the preferred pinned layer, in order to increase the GMR coefficient, $H_{UA}$ and $T_B$. An antiferromagnetic film selected from a Pt—Mn or Ni—Mn alloy system as a pinning layer has been extensively used in the GMR sensor.

In the selection process of an antiferromagnetic film from the Pt—Mn or Ni—Mn alloy system as a pinning layer, the Mn content of the Pt—Mn or Ni—Mn film must be carefully selected. A small difference in the Mn content leads to substantial variations in both $H_{UA}$ and $T_B$. In addition, since the Mn is the most diffusive and corrosive chemical element among all the chemical elements used in the GMR sensor, its content substantially determines the corrosion resistance and thermal stability of the GMR sensor.

The currently used Mn content of the Pt—Mn or Ni—Mn films is selected only from a small composition range for attaining a high $H_{UA}$. This Mn content may not be low enough to minimize the Mn diffusion, attain a high $T_B$, and ensure high corrosion resistance. Hence, it is difficult, or almost impossible, to find a suitable Mn content for either the Co—Fe/Pt—Mn or Co—Fe/Ni—Mn films to attain a high $H_{UA}$ and a high $T_B$ simultaneously, as well as desirable corrosion resistance.

For example, in the prior art GMR sensor with a Ni—Mn pinning layer, a Mn content of more than 57 at % is selected in order to attain a high $H_{UA}$ beyond 600 Oe. However, previous studies indicate that such a high Mn content leads to a low $T_B$ and to a low corrosion resistance. Hence, to operate a smaller GMR sensor properly at high temperatures for magnetic recording at ever increasing densities, very robust pinning layers must be found.

In previous studies, a GMR sensor with a pinning layer formed of two antiferromagnetic films selected from two different binary alloy systems, such as Ir—Mn/Pt—Mn, Ir—Mn/Ni—Mn, Pt—Mn/Ni—Mn or Ni—Mn/Pt—Mn films, has been explored. The Ir—Mn film is selected and preferred to be in contact with the Co—Fe film since it does not require annealing for developing exchange coupling to the Co—Fe film, thereby eliminating concerns on the Mn diffusion. The Pt—Mn film is also selected to be in contact with the Co—Fe film to minimize the Mn diffusion and to provide a high $H_{UA}$. The Ni—Mn film should not to be in contact with the Co—Fe film, but is preferably used to provide a high $T_B$. However, since the Ir—Mn, Pt—Mn, and Ni—Mn films have different lattice parameters, the lattice mismatch causes exchange decoupling between the two different antiferromagnetic films, leading to difficulties in achieving the desired improvements.

A GMR sensor with a pinning layer of an antiferromagnetic film selected from a ternary alloy system, such as Ir—Pt—Mn, Ir—Ni—Mn, Pt—Ni—Mn films, etc., has also been explored. The antiferromagnetism has been found to be very weak, possibly due to incompatibility of Ir, Pt and Ni elements.

A Ni—Cr—Fe seed layer wherein the atomic percentage of Cr is between 20 and 50% is described by Lee, et al. in U.S. Pat. No. 6,141,191. A top-type GMR sensor is described with the structure of seed/free/spacer/pinned/AFM/cap layers, where the seed layer is a non-magnetic Ni—Cr—Fe or Ni—Cr film and the AFM layer is preferably a Ni—Mn film. The nonmagnetic Ni—Cr—Fe seed layer is said to result in a large-grain structure in the deposited layers enhancing the GMR coefficients and the thermal stability. The improved thermal stability enables the use of the Ni—Mn film with its high blocking temperature and strong pinning field as the AFM pinning layer, without performance degradation from the high temperature anneal step needed to develop the desired exchange coupling.

Huai, et al. (U.S. Pat. No. 6,222,707) disclose bottom-type and dual-type GMR sensors using Ni—Cr—Fe seed layers with a range of Cr atom percentage between 20% and 50%, with approximately 25 atomic percent being preferred. The top-type GMR sensor comprises seed/AFM/pinned/spacer/free/cap layers, while the dual-type GMR sensor comprises seed/AFM/pinned/spacer/free/spacer/pinned/AFM/cap layers. An improvement in the texture of synthetic pinned layers comprising Co—Fe/Ru/Co—Fe films is noted.

In U.S. Pat. No. 6,046,892 to Aoshima, et al. a bottom-type GMR sensor is disclosed with Co—Fe—B free and pinned layers and Ta/Ni—Cr—Fe seed layers.

In a published U.S. patent application Ser. No. 2004/0105193 by Horng, et al., a 30 angstrom thick seed layer of Ni—Cr with 31% atomic percent of Cr is used to form a bottom-type GMR sensor and a dual-type GMR sensor having synthetic pinned layers. The seed layer is said to allow the use of extremely thin (approximately 80 angstroms) Pt—Mn pinning layers as well as extremely thin pinned and free layers.

In a published U.S. patent application Ser. No. 2004/0042130 by Lin, et al. three seed layers comprising Al—O(3 nm), Ni—Cr—Fe(3 nm) and Ni—Fe(1 nm) films are followed by the Pt—Mn pinning layer. The '130 application is commonly assigned with the present application and has a common co-inventor with the present application. The $Al_2O_3$ film used as the bottom gap layer is preferably directly sputtered in an argon gas from an alumina target, while the Al—O film used as the seed layer is preferably reactively sputtered in mixed argon and oxygen gases from an aluminum target. A pinning layer, preferably comprising a 15 nm thick Pt—Mn film, is then deposited on the seed layers. Thereafter, pinned layers are deposited on the pinning layer. The pinned layers comprise a ferromagnetic Co—Fe first pinned layer, an antiparallel (AP) Ru spacer layer, and a ferromagnetic Co—Fe second pinned layer. A spacer layer, preferably a Cu—O film, is deposited on the second pinned layer. Thereafter, free layers, preferably comprising Co—Fe and Ni—Fe films, are deposited on the Cu—O spacer layer. The cap layers, preferably comprising Cu and Ta films, are then deposited on the free layers.

In order for the GMR sensor to attain a narrower read gap for a higher linear density, a 7.5 nm thick Ir—Mn pinning layer has been suggested to replace the 15 nm thick Pt—Mn pinning layer. However, the use of the Ir—Mn pinning layer appears to be impractical due to the poor corrosion resistance of the Ir—Mn pinning layer.

Ir—Mn, Pt—Mn and Ni—Mn pinning layers have been extensively used in the prior art, but some difficulties still remains in using these pinning layers for magnetic recording at ever increasing densities. FIG. 3 shows easy-axis high-field magnetoresistance (MR) responses of top-type GMR sensors comprising Ta(3)/Ni—Fe(4.5)/Co—Fe(0.6)/Cu(2.4)/Co(3.2)/Ir—Mn(7.5)/Ta(6), Ta(3)/Ni—Fe(4.5)/Co—Fe(0.6)/Cu(2.4)/Co(3.2)/Pt—Mn(25)/Ta(6) and Ta(3)/Ni—Fe(4.5)/Co—Fe(0.6)/Cu(2.4)/Co(3.2)/Ni—Mn(25)/Ta(6) films (thickness in nm) after annealing for 2 hours at 280° C. with a magnetic field of 800 Oe in a high vacuum oven. This anneal is not needed for the Ir—Mn pinning layer which contains an antiferromagnetic face-centered-cubic (fcc) phase after deposition, but must be used for the Pt—Mn and Ni—Mn pinning layers to cause a phase transformation from a nonmagnetic fcc phase to an antiferromagnetic face-centered-cubic (fct) phase. The Ir—Mn GMR sensor exhibits a very low $H_{UA}$ but the highest GMR coefficient. The Pt—Mn GMR sensor exhibits the highest $H_{UA}$ but a lower GMR coefficient. The Ni—Mn GMR sensor exhibits the lowest GMR coefficient and the lowest $H_{UA}$.

FIGS. 4 and 5 show $H_{UA}$ and the GMR coefficient versus anneal time at 280° C. for the Ir—Mn, Pt—Mn and Ni—Mn GMR sensors. The temperature is controlled by a reactive heater and a continuous nitrogen flow in a tube oven attached to a vibrating sample magnetometer (VSM). In each anneal cycle, the oven temperature increases from ~30° C. to 280° C. in two minutes, remains at 280° C. for a set time, and then decreases to 30° C. in two minutes. After each anneal cycle, GMR properties are measured at 30° C. After annealing for 5 minutes, the $H_{UA}$ of the Ir—Mn GMR sensor reaches its saturation value of 110 Oe, corresponding to $J_K$ (an intrinsic exchange coupling energy) of 0.04 erg/cm². After annealing for 2 hours, the $H_{UA}$ of the Pt—Mn GMR sensor reaches its saturation value of 410 Oe, corresponding to $J_K$ of 0.16 erg/cm². After annealing for 13.2 hours, the $H_{UA}$ of the Ni—Mn GMR sensor reaches as high as 620 Oe, corresponding to $J_K$ of 0.24 erg/cm², without saturation yet. However, this extended anneal causes a substantial decrease in the GMR coefficient.

FIG. 6 shows $H_{UA}$ versus temperature for the Ir—Mn, Pt—Mn and Ni—Mn GMR sensors. The Ir—Mn, Pt—Mn and Ni—Mn GMR sensors exhibit $T_B$ (a blocking temperature, which $H_{UA}$ reaches 0) of 270, 370 and 380° C., respectively. When the Ir—Mn, Pt—Mn and Ni—Mn GMR sensors operate at 160° C., the $H_{UA}$ values are 60, 340 and 540 Oe, respectively. Hence, the Ir—Mn GMR senor shows the worst thermal stability, while the Ni—Mn sensor the highest. In addition, the Ir—Mn GMR sensor has poor corrosion resistance.

Based on all these experimental results, the Pt—Mn pinning layer appears to be the most suitable among the three types of pinning layers. As recently described in the prior art, the top-type Pt—Mn GMR sensor has been improved with four major approaches. First, the Ta seed layer has been replaced by Al—O/Ni—Cr—Fe/Ni—Fe seed layers for increasing the GMR coefficient. Second, the Co—Fe pinned layer is replaced by Co—Fe/Ru/Co—Fe pinned layers for minimizing a demagnetizing field ($H_D$). Third, the Cu spacer layer has been replaced by a Cu—O spacer layer for attaining a negative ferromagnetic coupling field ($H_F$). Fourth, the structure of the GMR sensor is reversed for ease in a read-head fabrication process. In this bottom-type GMR sensor, $H_D$ is smaller than $H_F$, so that $H_F$ must be negative in order for the sum of $H_F$ and $H_D$ to counterbalance $H_I$ ($H_F+H_D=H_I$) for optimally biased sensor operation.

The Ir—Mn pinning layer appears to be the least suitable among the three types of pinning layers. It nevertheless has two unique features important for magnetic recording at ever increasing densities. First, the Ir—Mn pinning layer can be as thin as 7.5 nm, so that it can be sandwiched into a narrow read gap for a high linear density. In contrast, the Pt—Mn and Ni—Mn pinning layers must be at least as thick as 15 and 20 nm, respectively. Second, the Ir—Mn pinning layer causes the Co—Fe pinned layer to induce an easy-axis coercivity ($H_{CE}$) much lower than the Pt—Mn and Ni—Mn pinning layers. This low $H_{CE}$ is important in preventing the magnetization of the Co—Fe pinned layer from irreversible rotation.

A further improvement of the Ir—Mn pinning layer is thus desired for magnetic recording at ever increasing densities. In this invention, a Cr element is added into the Ir—Mn pinning layer for improving its corrosion resistance. On Al—O/Ni—Cr—Fe/Ni—Fe seed layers with optimal compositions and thicknesses, the Ir—Mn—Cr pinning layer as thin as 5 nm can strongly exchange-couple to the Co—Fe pinned layer with an optimal composition, inducing a high $H_{UA}$.

SUMMARY OF THE INVENTION

A giant magnetoresistance (GMR) sensor with strongly pinning and pinned layers is described for magnetic recording at ultrahigh densities. The pinning layer is an antiferromagnetic (AFM) iridium-manganese-chromium (Ir—Mn—Cr) film deposited on Al—O/Ni—Cr—Fe/Ni—Fe seed layers. The GMR sensor according to the invention can be used as a top-type, bottom-type or dual-type GMR sensor in either a current-in-plane (CIP) or current-perpendicular-to-plane (CPP) GMR head. Without the seed layers according to the invention the Ir—Mn—Cr film provides a nearly zero pinning field. In this invention, however, with Al—O/Ni—Cr—Fe/Ni—Fe seed layers having optimal compositions and thicknesses, the Ir—Mn—Cr film strongly exchange-couples to its overlying film Co—Fe pinned layer, providing a high pinning field and a blocking temperature of around 250° C. The inclusion of Cr in the Ir—Mn—Cr pinning layer improves its corrosion resistance, and with the seed layers according to the invention, the pinning field remains high.

One preferred embodiment of a bottom-type GMR sensor according to the invention comprises:
  Al—O/Ni—Cr—Fe/Ni—Fe seed layers;
  an antiferromagnetic Ir—Mn—Cr pinning layer;
  Co—Fe/Ru/Co—Fe pinned layers;
  a Cu—O spacer layer;
  Co—Fe/Ni—Fe free layers; and
  a Ta cap layer.

The first pinned layer is preferably a ferromagnetic Co—Fe film with an Fe content ranging from 20 to 40 at % for strong exchange coupling to the Ir—Mn—Cr pinning layer. The net magnetic moment of the Co—Fe/Ru/Co—Fe pinned layers is designed to be nearly zero in order to achieve a pinning field of beyond 3,000 Oe. The composition of the Co—Fe first pinned layer is optimized in order to attain high magnetostriction needed for a high-stress-induced pinning field.

One preferred embodiment of a top-type GMR sensor according to the invention comprises:
  Al—O/Ni—Cr—Fe seed layers;
  Ni—Fe/Co—Fe free layers;
  a Cu—O spacer layer;
  Co—Fe/Ru/Co—Fe pinned layers;
  an antiferromagnetic Ir—Mn—Cr pinning layer; and
  a Ta cap layer.

One preferred embodiment of a dual-type GMR sensor according to the invention comprises:
  Al—O/Ni—Cr—Fe/Ni—Fe seed layers;
  an antiferromagnetic Ir—Mn—Cr pinning layer;
  Co—Fe/Ru/Co—Fe pinned layers;
  a Cu—O spacer layer;
  Co—Fe/Ni—Fe/Co—Fe free layers;
  a Cu—O spacer layer;
  Co—Fe/Ru/Co—Fe pinned layers;
  antiferromagnetic Ir—Mn—Cr pinning layer; and
  a Ta cap layer.

A method for achieving a nearly zero net magnetic moment of Co—Fe/Ru/Co—Fe pinned layers in the GMR sensor is described in the related application reference above. Al—O/Ni—Cr—Fe/Ni—Fe/Ir—Mn—Cr/Co—Fe/Ru/Co—Fe/Cu—O/Ta films are deposited on a glass substrate. The first pinned layer is varied in thickness while the other pinned layer is held constant in thickness. The nearly zero net areal magnetic moment is determined by plotting a relationship between the net areal magnetic moment and the thickness of the first pinned layer. The thickness which corresponds most closely to zero net areal magnetic moment is chosen as the design point for the GMR sensor. With a nearly zero net magnetic moment, the Co—Fe/Ru/Co—Fe pinned layers are rigidly pinned by its underlying Ir—Mn—Cr pinning layer, and no demagnetizing field is induced. This Ir—Mn—Cr GMR sensor can operate based on a field balance between a ferromagnetic coupling field and a current-induced field, thus simplifying a design for optimally biased sensor operation.

DETAILED DESCRIPTION OF THE INVENTION AND THE PREFERRED EMBODIMENTS

Figure 7A:
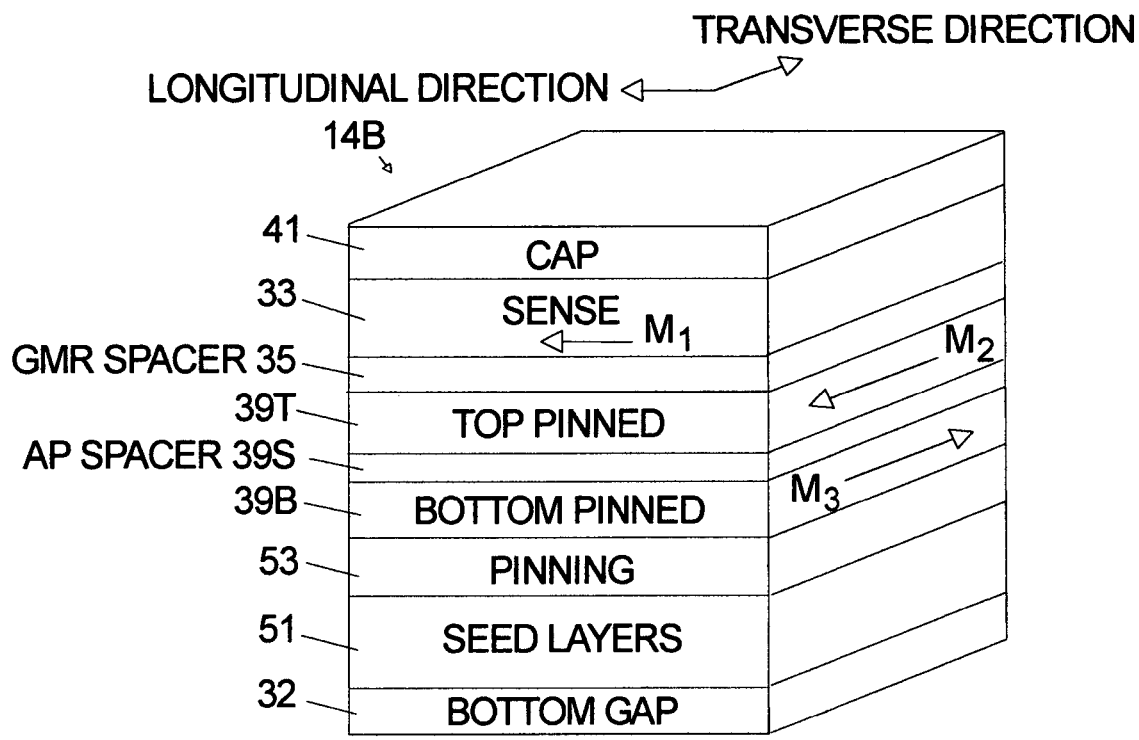
FIG. 7A is an illustration of a bottom-type GMR sensor according to the prior art as viewed parallel to an air bearing surface.

A bottom-type giant magnetoresistance (GMR) sensor 14B with strongly pinning and pinned layers, as shown in FIG. 7A, is described for magnetic recording at ultrahigh densities according to the invention. The GMR sensor 14B is used in a current-in-plane (CIP) storage system, and can be also used in a current-perpendicular-to-plane (CPP) storage system. The thicknesses shown in the figures are not according to scale. The thickness of the layers are according to the prior art except where note below. The bottom gap layer 32 is preferably an $Al_2O_3$ film deposited on the bottom shield layer (not shown). The bottom gap layer 32 is formed according to the prior art and is followed by the seed layers 51 according to the invention. The pinning layer 53 is deposited next and is followed by a first pinned layer 39B, an AP spacer layer 39S and a second pinned layer 39T. The GMR spacer layer 35 separates the second pinned layer 39T from the free (sense) layers 33. The cap layer 41 is deposited last. The remaining layers (not shown) are according to the prior art. A standard wafer used in the fabrication process typically comprises an alumina-TiC substrate coated with an alumina film deposited thereon.

Figure 7B:
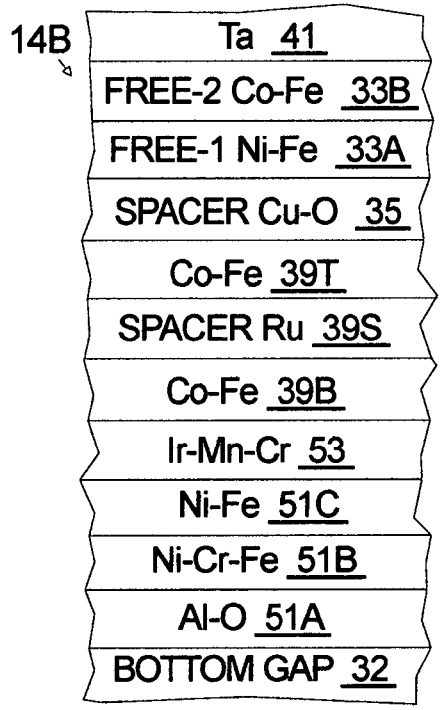
FIG. 7B is an illustration of selected layers of a bottom-type GMR sensor according to the invention as viewed parallel to an air bearing surface.

The seed layers 51 according to the invention include three seed layers as shown in FIG. 7B. The thicknesses given herein are not intended to be limitations, but rather are given as examples of possible embodiments. The seed layers according to the invention are deposited on a bottom gap layer 32. The first seed layer is an Al—O film 51A, which is preferably reactively sputtered in mixed argon and oxygen gases from an aluminum target. The second seed layer is a Ni—Cr—Fe film 51B. The first and second seed layers are nonmagnetic. The third seed layer is a ferromagnetic Ni—Fe film 51C. The first and second seed layers 51A, 51B can each be about 3 nm thick. The third seed layer 51C can be about 1 nm thick. The three seed layers are sequentially deposited preferably by a vacuum deposition process such as ion-beam or DC-magnetron sputtering. The seed layer combination according to the invention is believed to act to coarsen the grain size in the crystalline grains which are grown upon it.

A pinning layer 53 is deposited onto the third seed layer 51C. The pinning layer 53 is preferably an antiferromagnetic Ir—Mn—Cr film, which can be about 7.5 nm thick. The Ir—Mn—Cr pinning layer can be deposited by standard techniques such as sputter deposition from an Ir—Mn—Cr target. The pinned layers comprise a first pinned layer 39B preferably made of a 77Co-23Fe film, an AP spacer layer 39S preferably made of a ruthenium (Ru) film, and a second pinned layer 39T preferably made of a 90Co-10Fe film. The net magnetic moment of the 77Co-23Fe/Ru/90Co-10Fe pinned layers is designed to be nearly zero in order to achieve a pinning field of beyond 3,000 Oe. The composition of the 77Co-23Fe first pinned layer 39B below the Ru spacer layer is selected after optimization for attaining high magnetostriction needed for a high-stress-induced pinning field. Recording testing of the GMR sensor according to the invention has shown a high signal amplitude and high thermal stability.

To exhibit needed antiferromagnetism, the prior art Pt—Mn pinning layer must be as thick as 15 nm, but the Ir—Mn—Cr pinning layer 53 can be as thin as 5 nm when used with seed layers according to the invention. The Mn content of the prior art Pt—Mn pinning layer must be selected from a narrow composition range (from 49 at % to 52%), but the Mn and Cr contents of the Ir—Mn—Cr pinning layer can be selected from wide composition ranges (from 70 to 80 at % and from 0 to 10 at %, respectively). The Cr element adds high corrosion resistance to the Ir—Mn—Cr film. The antiferromagnetism remains strong even when the Mn content reaches as low as 70 at % and the Cr content reaches as high as 10 at. %. A lower Mn content and a higher Cr content facilitate further improvements in the corrosion resistance.

The 90Co-10Fe/Ru/90Co-10Fe pinned layers commonly used in the prior art have a non-zero net magnetic moment. According to the invention, a Co—Fe pinned layer with an Fe content ranging from 10 to 90 at % is used to contact the Ir—Mn—Cr pinning layer for the top-type, bottom-type and dual-type GMR sensor. More preferably, with an Fe content ranging from 30 to 70 at %, the GMR sensor exhibits a high unidirectional anisotropy field ($H_{UA}$) and a high saturation magnetostriction ($\lambda_S$). The Co—Fe first pinned layer 39B is thus strongly pinned by its underlying Ir—Mn—Cr pinning layer 53 and by stresses induced in the head fabrication process. As a result, its magnetization will not be rotated until an external field exceeds the sum of pinning fields determined by both the $H_{UA}$ and $\lambda_S$.

A preferred embodiment of the invention uses the 77Co-23Fe/Ru/90Co-10Fe pinned layers with a nearly zero net magnetic moment. The $H_{UA}$ artificially increases with decreasing the net magnetic moment, and becomes nearly infinite when the net magnetic moment reaches zero. As a result, the 77Co-23Fe/Ru/90Co-10Fe pinned layers with a nearly zero net magnetic moment is rigidly pinned by its underlying Ir—Mn—Cr pinning layer, and their magnetizations will not be rotated until an external field exceeds the sum of pinning fields determined by a spin-flop field across the Ru spacer layer ($H_{SP}$) and $\lambda_S$. A method of zeroing the net magnetic moment of the 77Co-23Fe/Ru/90Co-10Fe pinned layers, which plays a very crucial role in the viability of this GMR sensor, will be described.

In the prior art, the GMR sensor is operated based on a balance among a demagnetizing field (induced by a net magnetic moment), a ferromagnetic coupling field and a current-induced field. In this invention, the demagnetizing field is nearly zero due to a nearly zero net magnetic moment. As a result, the GMR sensor is operated based on a field between the ferromagnetic coupling field and the current-induced field. Therefore, it is easier to design a GMR sensor according to the invention for magnetic recording at ultrahigh densities.

One embodiment has a GMR sensor comprising an Al—O seed layer 51A of about 3 nm, a Ni—Cr—Fe seed layer 51B of about 3 nm, a Ni—Fe seed layer 51C of about 0.4 nm, an Ir—Mn—Cr pinning layer 53 of about 7.5 nm, a 77Co-23Fe first pinned layer 39B of about 1.65 nm, a Ru spacer layer 39S of about 0.8 nm, a 90Co-10Fe second pinned layer 39T of about 1.44 nm; a Cu—O spacer layer 35 of about 1.82 nm; a 90Co-10Fe first free layer 33A of about 1 nm, a 90Ni-10Fe second free layer 33B of about 1.6 nm; and a Ta cap layer 41 of about 4 nm. The GMR sensor is deposited on a wafer in an integrated ion-beam/DC-magnetron sputtering system. The depositions of Ni—Fe and Co—Fe ferromagnetic films are conducted with a deposition field of ~40 Oe, while the depositions of the other non-ferromagnetic films are conducted without the deposition field. After the depositions, the GMR sensor is annealed in a magnetic field in a direction perpendicular to the deposition field. This anneal is needed to thermally set the magnetizations of 77Co-23Fe/90Co-10Fe pinned layer in the direction perpendicular to the deposition field for proper sensor operation.

Figure 7C:
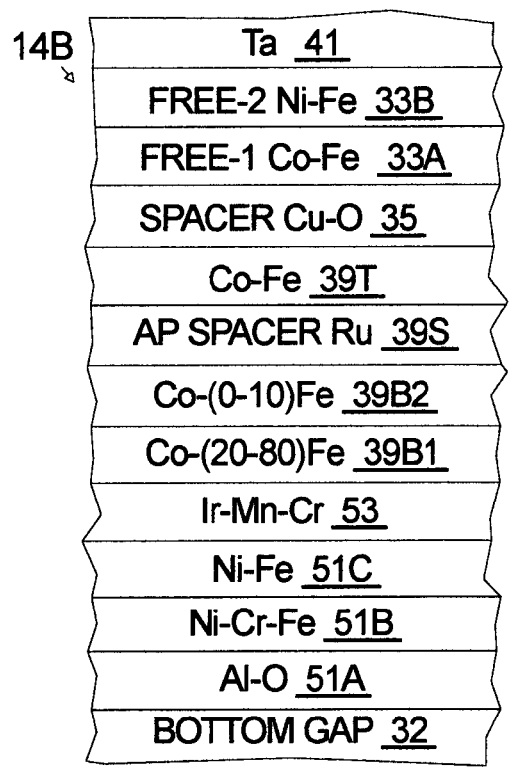
FIG. 7C is an illustration of selected layers of a bottom-type GMR sensor according to the invention as viewed parallel to an air bearing surface.

FIG. 7C illustrates an embodiment of the bottom-type GMR sensor with two layers 39B1, 39B2 for the first pinned layer. The portion of the first pinned layer 39B1 in contact with the Ir—Mn—Cr pinning layer is preferably Co—Fe with 20-80 atomic percent Fe. The portion of the first pinned layer 39B2 in contact with the Ru spacer layer is preferably Co—Fe with 0-10 atomic percent Fe.

Figure 12:
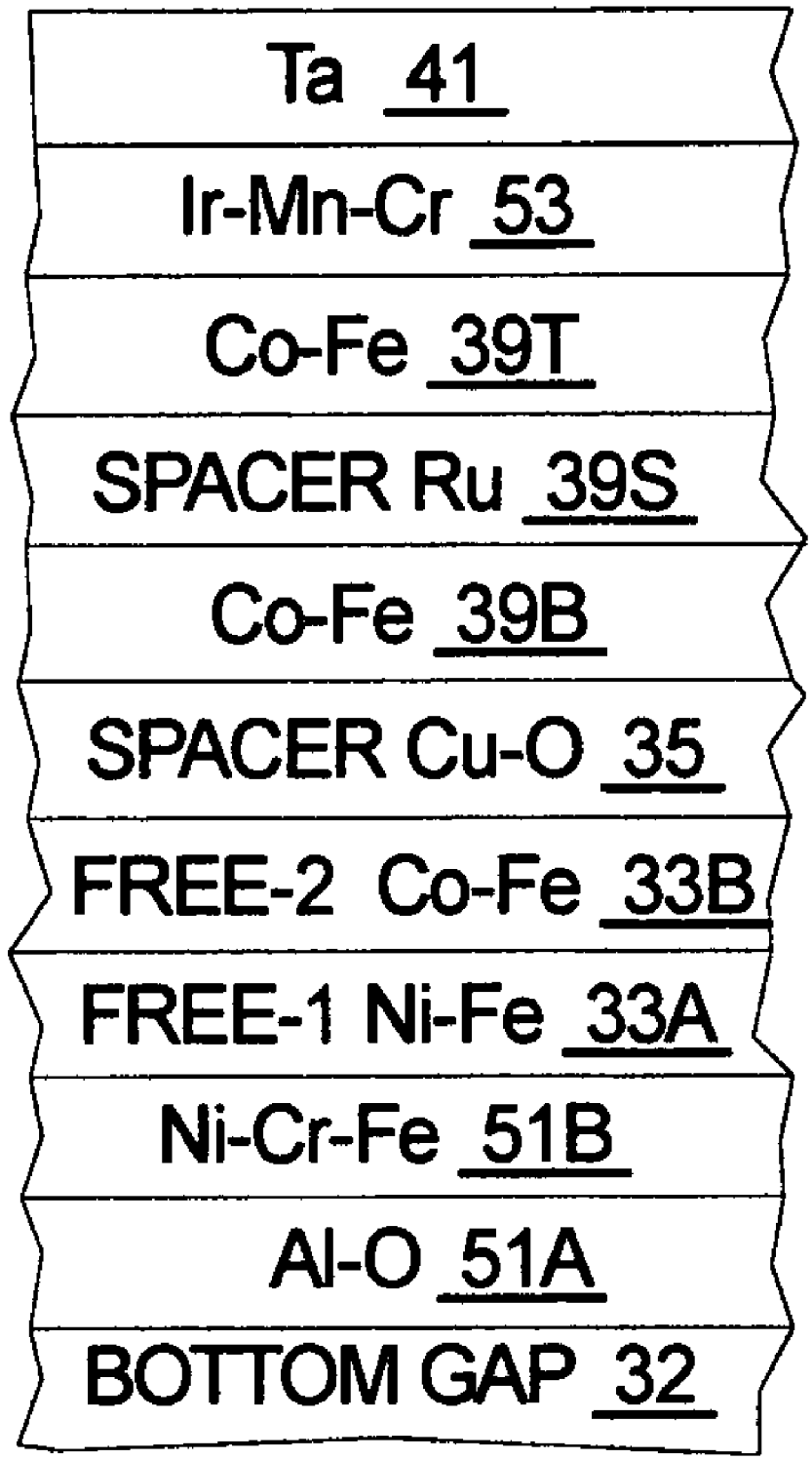
FIG. 12 is an illustration of selected layers of a top-type GMR sensor according to the invention as viewed parallel to an air bearing surface.

FIG. 12 illustrates a preferred embodiment of a top-type GMR sensor according to the invention. In this embodiment there are only two seed layers (Al—O/Ni—Cr—Fe), since the first free layer 33A is a ferromagnetic Ni—Fe film, which also acts as the ferromagnetic Ni—Fe third seed layer. The layers in this embodiment are:

Al—O/Ni—Cr—Fe seed layers 51A, 51B;
Ni—Fe/Co—Fe free layers 33A, 33B;
a Cu—O spacer layer 35;
Co—Fe/Ru/Co—Fe pinned layers 39B, 39S, 39T;
a antiferromagnetic Ir—Mn—Cr 53; and
a Ta cap layer 41.

Figure 13:
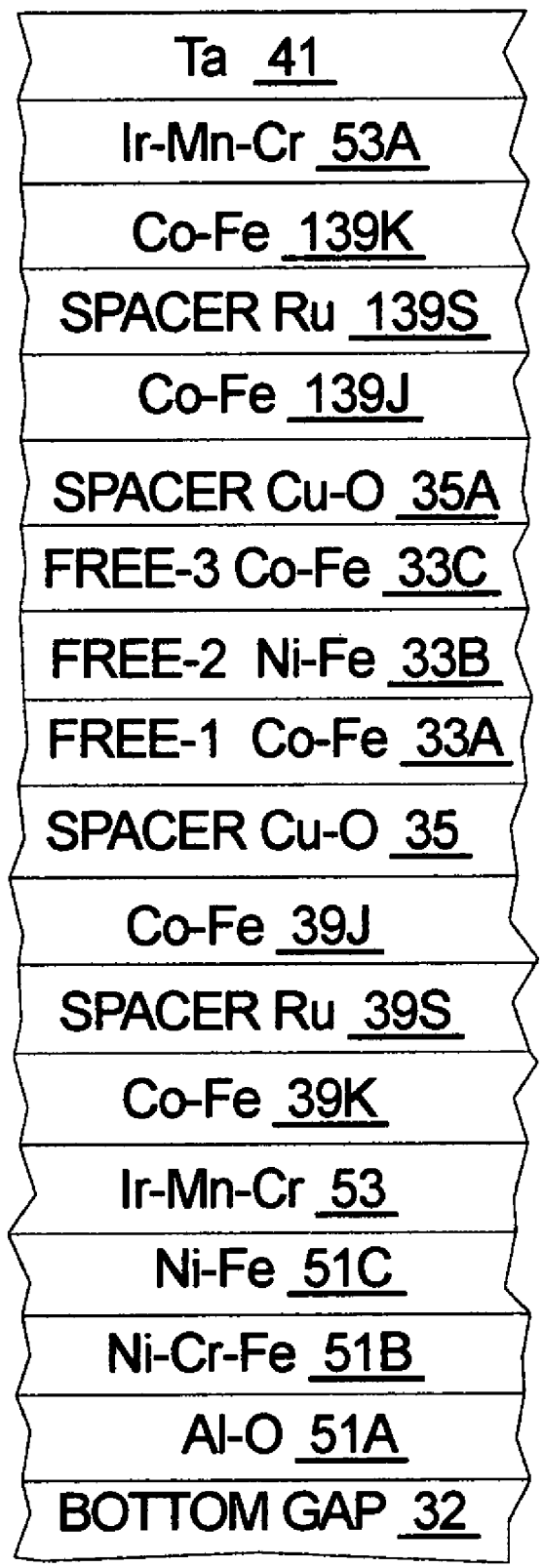
FIG. 13 is an illustration of selected layers of a dual-type GMR sensor according to the invention as viewed parallel to an air bearing surface.

FIG. 13 illustrates a preferred embodiment of a dual-type GMR sensor according to the invention. The layers in this embodiment are:

Al—O/Ni—Cr—Fe/Ni—Fe seed layers 51A, 51B, 51C;
an antiferromagnetic Ir—Mn—Cr first pinning layer 53;
a first set of Co—Fe/Ru/Co—Fe pinned layers 39K, 39S, 39J;
a Cu—O first spacer layer 35;
Co—Fe/Ni—Fe/Co—Fe free layers 33A, 33B, 33C;
a Cu—O second spacer layer 35A;
a second set of Co—Fe/Ru/Co—Fe pinned layers 139J, 139S, 139K;
an antiferromagnetic Ir—Mn—Cr second pinning layer 53A; and
a Ta cap layer 41.

Read-Head Fabrication Process

A read-head fabrication process embodiment according to the invention will be described. As in the prior art, a 1 µm thick Ni—Fe bottom shield layer and a 12 nm thick $Al_2O_3$ bottom gap layer are deposited on a wafer. Subsequently, a GMR sensor 14B according to the invention, as shown in FIG. 7B, comprising Al—O(3 nm)/Ni—Cr—Fe(3 nm)/Ni—Fe(0.4 nm) seed layers, an Ir—Mn—Cr(7.5 nm) pinning layer, 77Co-23Fe(1.65 nm)/Ru(0.8 nm)/90Co-10Fe(1.44 nm) pinned layers, a Cu—O(1.82 nm) spacer layer, Co—Fe(1 nm)/Ni—Fe(1.6 nm) free layers, and a Ta(4 nm) cap layer, are deposited on the $Al_2O_3$ bottom gap layer in an integrated ion-beam/DC-magnetron sputtering system. The depositions of Ni—Fe and Co—Fe ferromagnetic films are conducted with a deposition field of ~40 Oe, while the depositions of the other non-ferromagnetic films are conducted without the deposition field. After the depositions, the wafer is annealed with a field of 13,000 Oe in a direction perpendicular to the deposition field for 5 hours at 240° C.

The sensor width is defined by a prior art patterning process. In this prior art patterning process, bilayer photoresists are applied and exposed in a photolithographic tool to mask the selected read region for the GMR sensor, and then developed in a solvent to form an undercut. The GMR sensor in unmasked side regions is removed by ion milling until the $Al_2O_3$ bottom gap layer is exposed, and longitudinal bias and first conductor layers comprising Cr(3 nm)/Co—Pt—Cr(26.6 nm)/Ta(3 nm)/Rh(80 nm)/Ta(6 nm) films are immediately deposited into the side regions. After the depositions, the bilayer photoresists are lifted off and a similar patterning process continues for the depositions of second conductor layers comprising Au(80 nm)/Ta(6 nm) films. A 12 nm thick $Al_2O_3$ top gap layer is then deposited and then write-head fabrication process starts. After completing the read-head and write-head fabrication processes on the wafer, the wafer is cut into rows, and the rows are mechanically lapped to expose the air bearing surface of the read and write heads to air and to define the sensor height. After coating the air bearing surface with a carbon overcoat and cutting each row into dices, each dice is assembled to fabricate a magnetic transducer.

Use of Ir—Mn—Cr Pinning Layer

Figure 8:
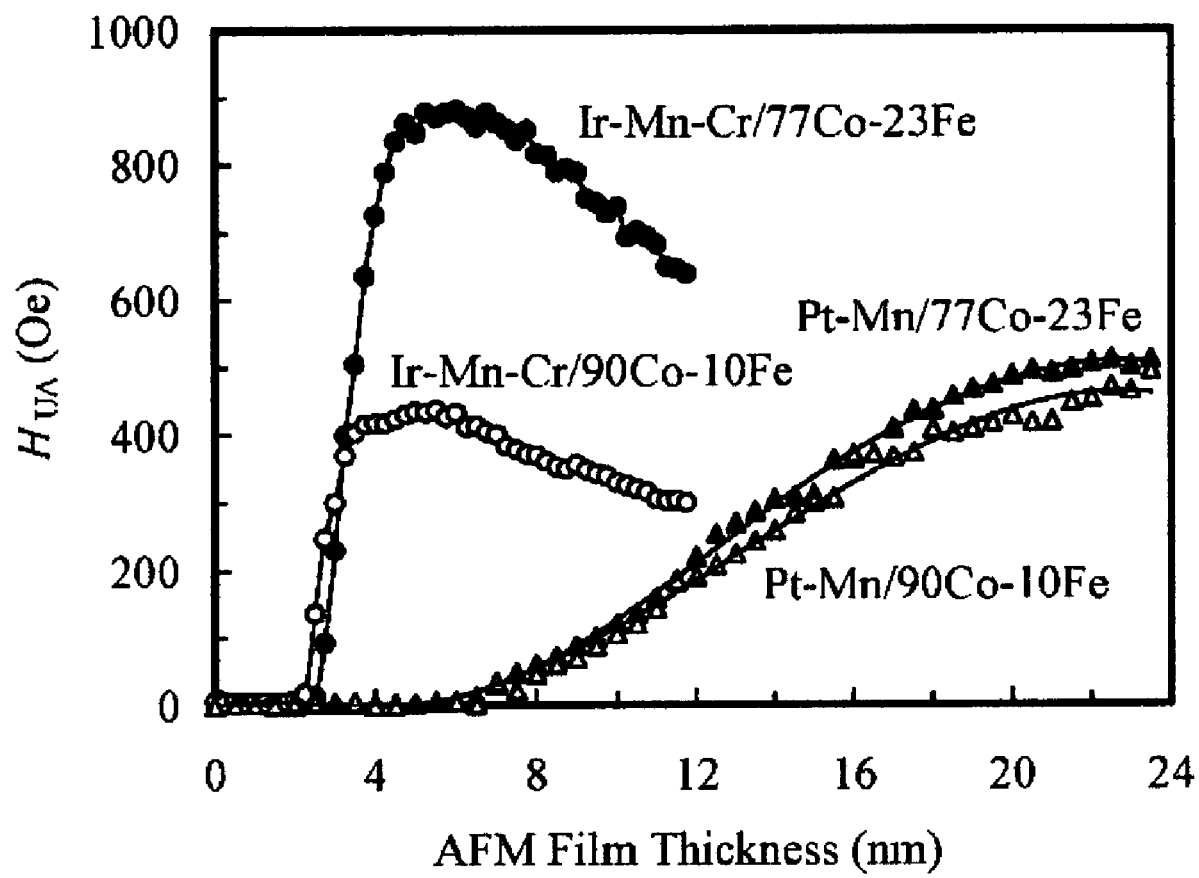
FIG. 8 is a graph of $H_{UA}$ versus Ir—Mn—Cr or Pt—Mn film thickness for Al—O(3 nm)/Ni—Cr—Fe(3 nm)/Ni—Fe(0.4 nm)/Ir—Mn—Cr/90Co-10Fe(3 nm)/Ru(2.4 nm)/Ta(4 nm), Al—O(3 nm)/Ni—Cr—Fe(3 nm)/Ni—Fe(0.4 nm)/Ir—Mn—Cr/77Co-23Fe(3 nm)/Ru(2.4 nm)/Ta(4 nm), Al—O(3 nm)/Ni—Cr—Fe(3 nm)/Ni—Fe(0.4 nm)/Pt—Mn/90Co-10Fe(3 nm)/Ru(2.4 nm)/Ta(4 nm), and Al—O(3 nm)/Ni—Cr—Fe(3 nm)/Ni—Fe(0.4 nm)/Pt—Mn/77Co-23Fe(3 nm)/Ru(2.4 nm)/Ta(4 nm) films.

FIG. 8 shows $H_{UA}$ versus Ir—Mn—Cr or Pt—Mn film thickness for Al—O(3 nm)/Ni—Cr—Fe(3 nm)/Ni—Fe(0.4 nm)/Ir—Mn—Cr/90Co-10Fe(3 nm)/Ru(2.4 nm)/Ta(4 nm), Al—O(3 nm)/Ni—Cr—Fe(3 nm)/Ni—Fe(0.4 nm)/Ir—Mn—Cr/77Co-23Fe(3 nm)/Ru(2.4 nm)/Ta(4 nm), Al—O(3 nm)/Ni—Cr—Fe(3 nm)/Ni—Fe(0.4 nm)/Pt—Mn/90Co-10Fe(3 nm)/Ru(2.4 nm)/Ta(4 nm), and Al—O(3 nm)/Ni—Cr—Fe(3 nm)/Ni—Fe(0.4 nm)/Pt—Mn/77Co-23Fe(3 nm)/Ru(2.4 nm)/Ta(4 nm). On the Al—O/Ni—Cr—Fe/Ni—Fe seed layers, the Ir—Mn—Cr pinning layer as thin as 5 nm can strongly exchange-couple to the 90Co-10Fe and 77Co-23Fe pinned layers, inducing $H_{UA}$ values as high as 434 and 847 Oe, respectively (corresponding to $J_K$ values as high as 0.17 and 0.34 erg/cm$^2$, respectively). In addition, the $H_{CE}$ of the 90Co-10Fe and 77Co-23Fe pinned layers are as low as 28 and 198 Oe, respectively (not shown), much lower than the corresponding $H_{UA}$ values. In contrast, the Pt—Mn pinning layer must be at least as thick as 15 nm to strongly exchange-couple to the 90Co-10Fe and 77Co-23Fe pinned layers for attaining $H_{UA}$ values of 450 and 500 Oe, respectively (corresponding to $J_K$ values of 0.18 and 0.20 erg/cm$^2$, respectively). In addition, the $H_{CE}$ of the 90Co-10Fe and 77Co-23Fe pinned layers are as high as 550 and 600 Oe, respectively (not shown), higher than corresponding $H_{UA}$ values. It should be noted that the Pt—Mn pinning layer is deposited with ion-beam sputtering, and if the Pt—M pinning layer is deposited with DC magnetron sputtering and when its thickness exceeds 15 nm, $H_{CE}$ can be smaller than $H_{UA}$. Hence, the thin Ir—Mn—Cr pinning layer is more suitable than the thick Pt—Mn pinning layer for sandwiching into a narrow read gap for a high linear density. In addition, since its $H_{CE}$ is much lower than $H_{UA}$, there will be no concerns about the irreversible rotation of the magnetization of the 77Co-23Fe first pinned layer.

Figure 9:
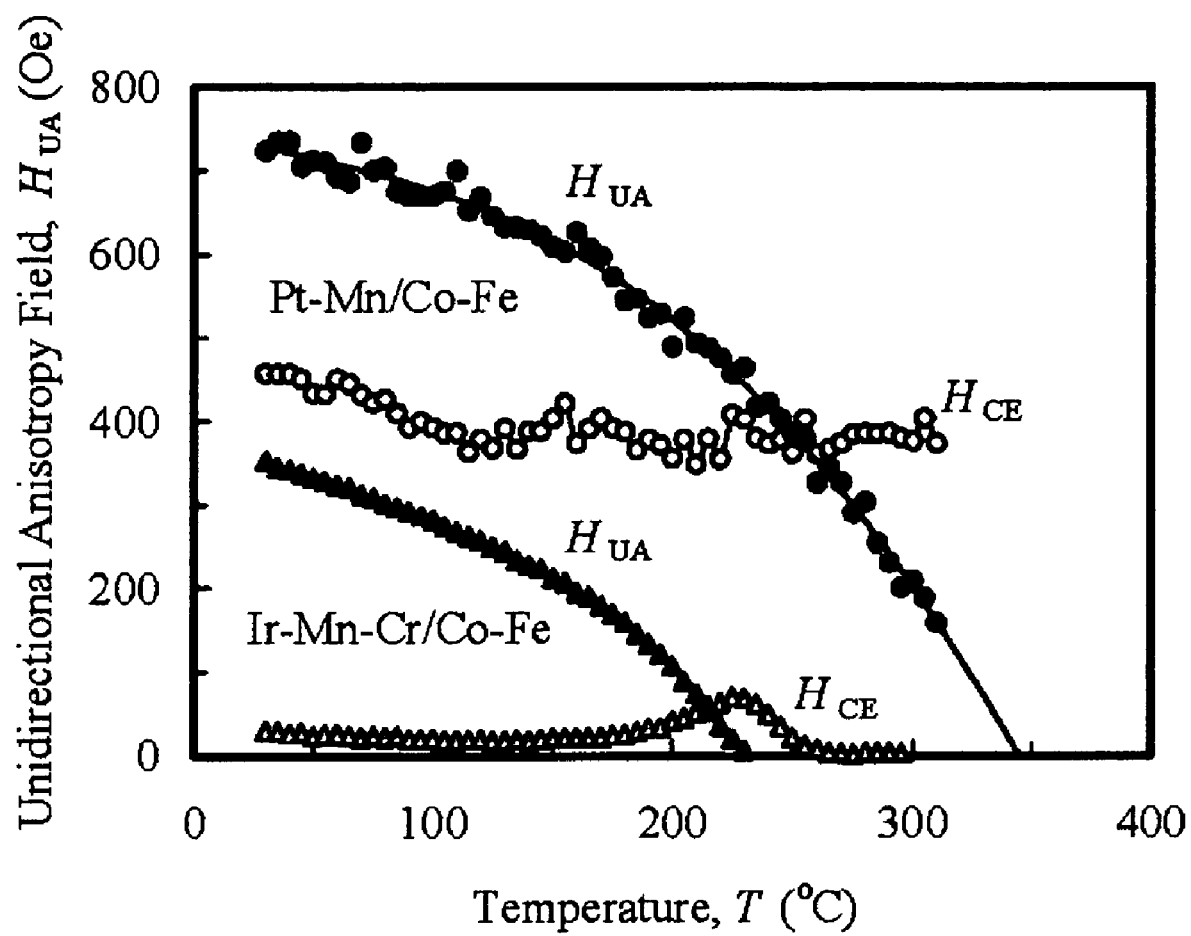
FIG. 9 is a graph of $H_{CE}$ and $H_{UA}$ versus temperature for Al—O(3 nm)/Ni—Cr—Fe(3 nm)/Ni—Fe(0.4 nm)/Ir—Mn—Cr(7.5 nm)/90Co-10Fe(3 nm)/Ru(2.4 nm)/Ta(4 nm) and Al—O(3 nm)/Ni—Cr—Fe(3 nm)/Ni—Fe(0.4 nm)/Pt—Mn(20 nm)/90Co-10Fe(3 nm)/Ru(2.4 nm)/Ta(4 nm) films.

FIG. 9 shows $H_{CE}$ and $H_{UA}$ versus temperature for Al—O(3 nm)/Ni—Cr—Fe(3 nm)/Ni—Fe(0.4 nm)/Ir—Mn—Cr(7.5 nm)/90Co-10Fe(3 nm)/Ru(0.8 nm)/Ta(4 nm) and Al—O(3 nm)/Ni—Cr—Fe(3 nm)/Ni—Fe(0.4 nm)/Pt—Mn(20 nm)/90Co-10Fe(3 nm)/Ru(0.8 nm)/Ta(4 nm) films. A thicker Ir—Mn—Cr pinning layer is selected to further reduce $H_{CE}$, while the Pt—Mn pinning layer is deposited with DC-magnetron sputtering and a thicker Pt—Mn pinning layer is selected, in order to attain $H_{CE}$ lower than $H_{UA}$. The Ir—Mn/Co—Fe and Pt—Mn/Co—Fe films exhibit $T_B$ values of 225 and 345° C., respectively. When the Ir—Mn and Pt—Mn bottom-type GMR sensors operate at 160° C., the $H_{UA}$ values are 200 and 610 Oe, respectively. Hence, the Ir—Mn pinning layer shows worse thermal stability. However, as described below, such concerns will be solved when 77Co-2310Fe/Ru/90Co-10Fe pinned layers with a zero net magnetic moment are used according to the invention.

Use of Al—O/Ni—Cr—Fe/Ni—Fe Seed Layers

Al—O(3 nm)/Ni—Cr—Fe/Ir—Mn—Cr(7.5 nm)/77Co-23Fe(3 nm)/Ru(2.4 nm)/Ta(4 nm) and Al—O(3 nm)/Ni—Cr—Fe/Ni—Fe(0.4 nm)/Ir—Mn—Cr(7.5 nm)/77Co-23Fe (3 nm)/Ru(2.4 nm)/Ta(4 nm) films are deposited on glass substrates with a field of ~40 Oe in an integrated ion-beam/DC-magnetron sputtering system. After the depositions, the multilayer films are annealed with a field of 13,000 Oe in a direction perpendicular to the deposition field for 5 h at 240° C.

Figure 10:
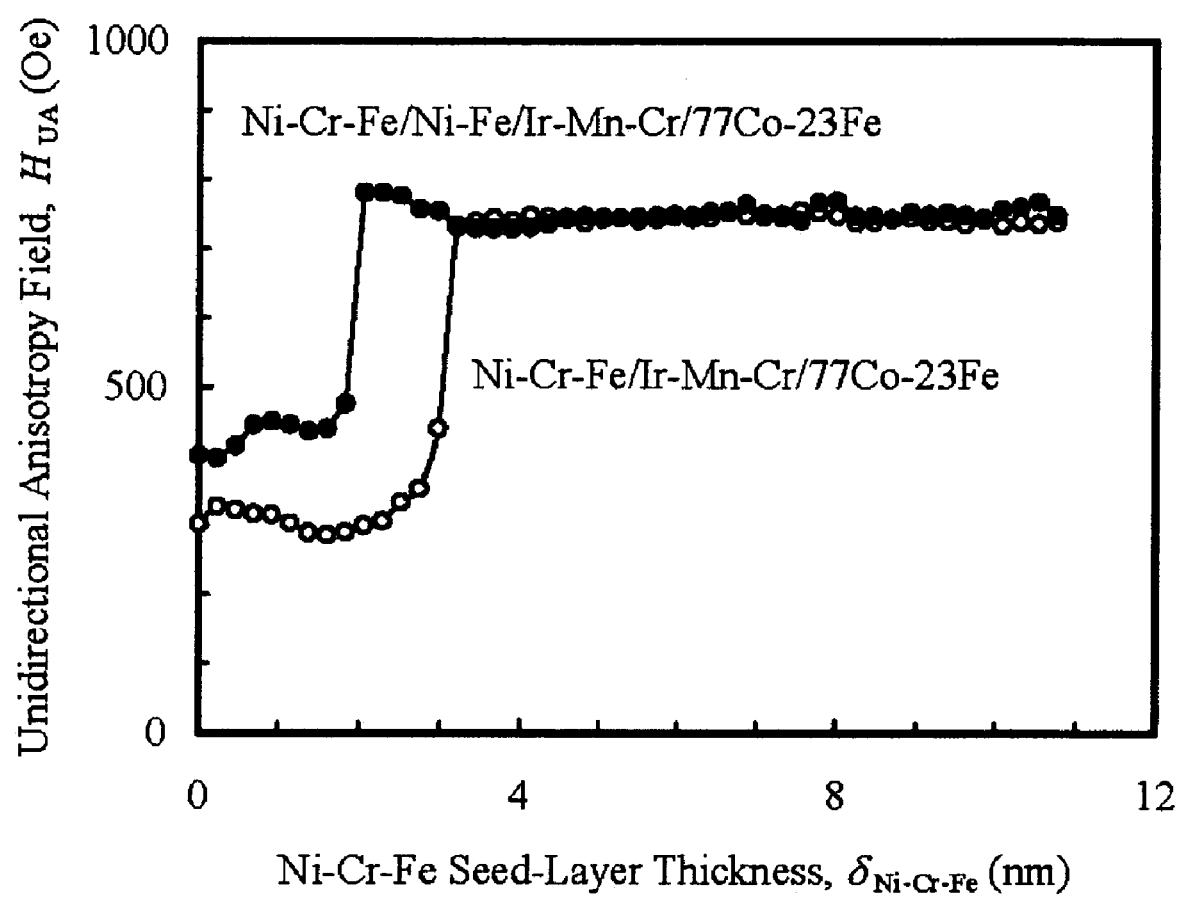
FIG. 10 is a graph of $H_{UA}$ versus the Ni—Cr—Fe seed-layer thickness for Al—O(3 nm)/Ni—Cr—Fe/Ir—Mn—Cr (7.5 nm)/90Co-10Fe(3 nm)/Ru(2.4 nm)/Ta(4 nm) and Al—O(3 nm)/Ni—Cr—Fe/Ni—Fe/Ir—Mn—Cr(7.5 nm)/90Co-10Fe/Ru(2.4 nm)/Ta(4 nm) films.

FIG. 10 shows $H_{UA}$ versus the Ni—Cr—Fe seed-layer thickness for Al—O(3 nm)/Ni—Cr—Fe/Ir—Mn—Cr(7.5 nm)/77Co-23Fe(3 nm)/Ru(2.4 nm)/Ta(4 nm) and Al—O(3 nm)/Ni—Cr—Fe/Ni—Fe(0.4 nm)/Ir—Mn—Cr(7.5 nm)/77Co-23Fe(3 nm)/Ru(2.4 nm)/Ta(4 nm) films. Without the Ni—Fe seed layer, $H_{UA}$ reaches as high as 730 Oe (corresponding to $J_K$ of 0.29 erg/cm$^2$) when the Ni—Cr—Fe film is 3.2 nm thick. With the Ni—Fe seed layer as thin as 0.4 nm, $H_{UA}$ reaches as high as 790 Oe (corresponding to $J_K$ of 0.32 erg/cm$^2$) when the Ni—Cr—Fe film is 2 nm thick. Hence, Al—O/Ni—Cr—Fe/Ni—Fe seed layers with optimal thicknesses play a crucial role in substantially increasing $J_K$. It should be noted that, the use of the 77Co-23Fe pinned layer, instead of the 90Co-10Fe pinned layer, also plays a crucial role in substantially increasing $J_K$.

Use of 77Co-23Fe First and 90Co-10Fe Second Pinned Layers

Al—O(3 nm)/Ni—Cr—Fe(3 nm)/Ni—Fe(0.4 nm)/Ir—Mn—Cr(7.5 nm)/90Co-10Fe/Ru(2.4 nm)/Ta(4 nm) and Al—O(3 nm)/Ni—Cr—Fe (3 nm)/Ni—Fe(0.4 nm)/Ir—Mn—Cr(7.5 nm)/77Co-23Fe/Ru(2.4 nm)/Ta(4 nm) films are deposited on glass substrates with a field of ~40 Oe in an integrated ion-beam/DC-magnetron sputtering system. After the depositions, the multilayer films are annealed with a field of 13,000 Oe in a direction perpendicular to the deposition field for 5 hours at 240° C.

Figure 11:
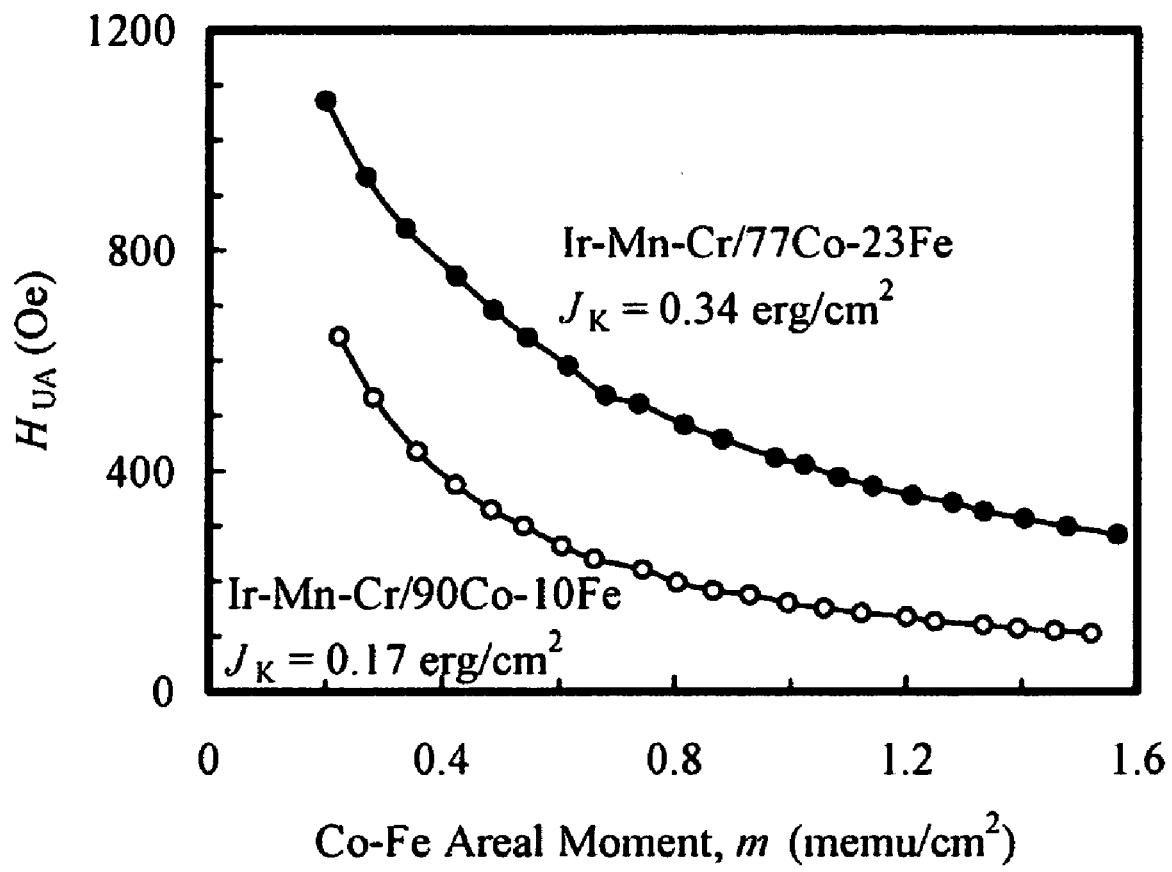
FIG. 11 is a graph of $H_{UA}$ versus the Co—Fe pinned-layer magnetic moment. The Ir—Mn—Cr(7.5 nm)/90Co-10Fe films exhibit $J_K$ of 0.17 erg/cm$^2$, while the Ir—Mn—Cr(7.5 nm)/77Co-23Fe films exhibit $J_K$ of 0.34 erg/cm$^2$.

FIG. 11 shows $H_{UA}$ versus the Co—Fe pinned-layer magnetic moment. The Ir—Mn—Cr/90Co-10Fe films exhibit $J_K$ of 0.17 erg/cm$^2$, while the Ir—Mn—Cr/77Co-23Fe films exhibit $J_K$ of 0.34 erg/cm$^2$. Hence, the 77Co-23Fe first pinned layer is preferably used for contacting the Ir—Mn—Cr pinning layer. On the other hand, it has been found that the 90Co-10Fe second pinned layer is preferably used for contacting the Cu—O spacer layer for maximizing GMR effects.

The 77Co-23Fe first pinned layer also plays a crucial role in ensuring strong pinning. It has a positive saturation magnetostriction much higher than the 90Co-10Fe pinned layer, and thus stresses induced during mechanical lapping facilitates its magnetization to be oriented in a direction perpendicular to the ABS. When the Ir—Mn—Cr GMR sensor operates at high temperatures, $H_{UA}$ becomes even lower, while this temperature-independent stress-induced pinning becomes more important for proper sensor operation. As a result, an Ir—Mn—Cr GMR sensor with the 77Co-23Fe/Ru/90Co-10Fe pinned layers is used in this preferred embodiment.

Figure 14:
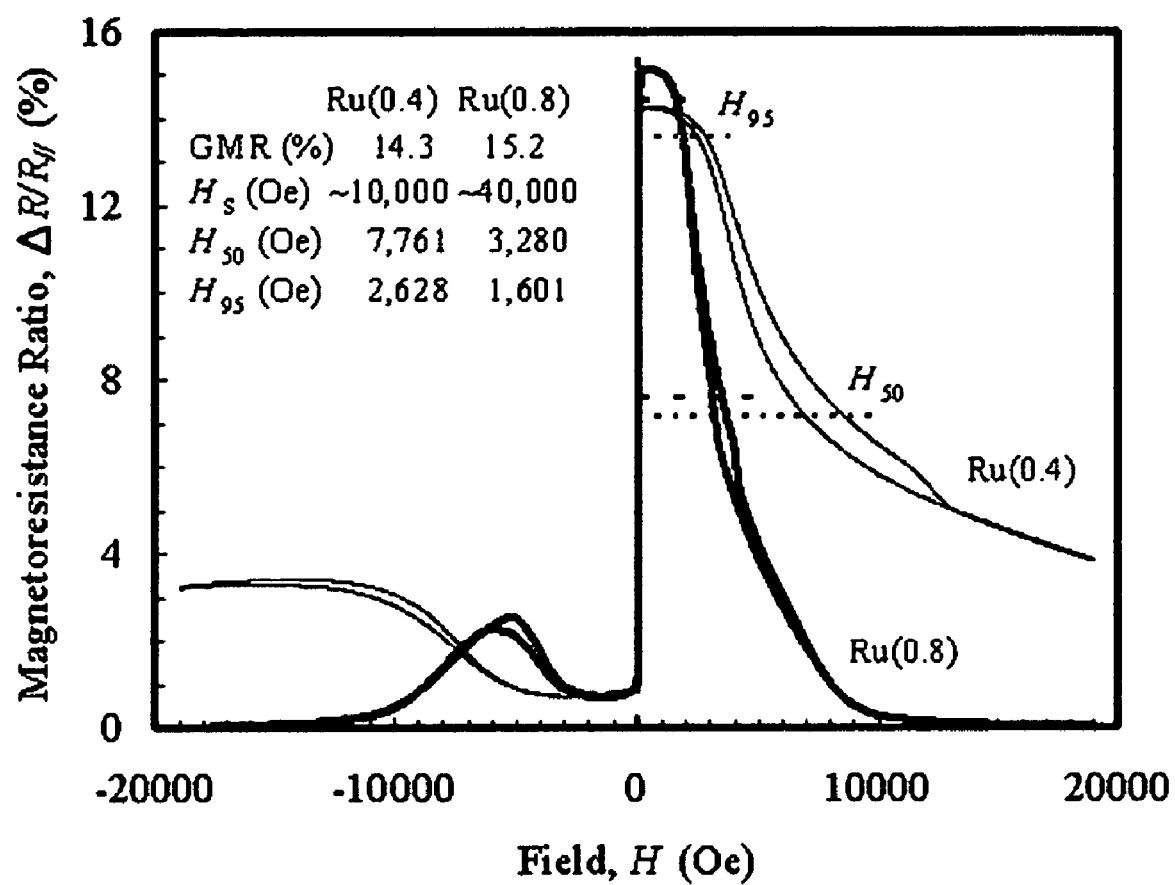
FIG. 14 is a chart showing the R versus H hysteresis loops of Ir—Mn—Cr GMR sensors proposed in the invention.

FIG. 14 shows the R versus H hysteresis loops of Ir—Mn—Cr GMR sensors proposed in the invention. The GMR sensors comprise Al—O(3)/Ni—Cr—Fe(3.2)/Ni—Fe(0.4)/Ir—Mn—Cr(7.5)/77Co-23Fe(1.65)/Ru/90Co-10Fe(1.6)/Cu—O (1.8)/Co—Fe(1)/Ni—Fe(1.6)/Ta(4) films. With a 0.4 nm thick Ru spacer layer, the GMR sensor exhibits a GMR coefficient of 14.3%, a Hs (a pinning field defined as a field when all magnetic films are parallel to each other) of ~40,000 Oe, $H_{50}$ (a pinning field defined as a field when the GMR coefficient decreases to 50% of its original value) of 7,761 Oe, and a $H_{95}$ (a pinning field defined as a field when the GMR coefficient decreases to 95 of its original value) of 2,628 Oe. With a 0.8 nm thick Ru spacer layer, the GMR sensor exhibits a GMR coefficient of 15.2%, an $H_S$ of ~10,000 Oe, an $H_{50}$ of 3,280 Oe, and an $H_{95}$ of 1,601 Oe.

Figure 1:
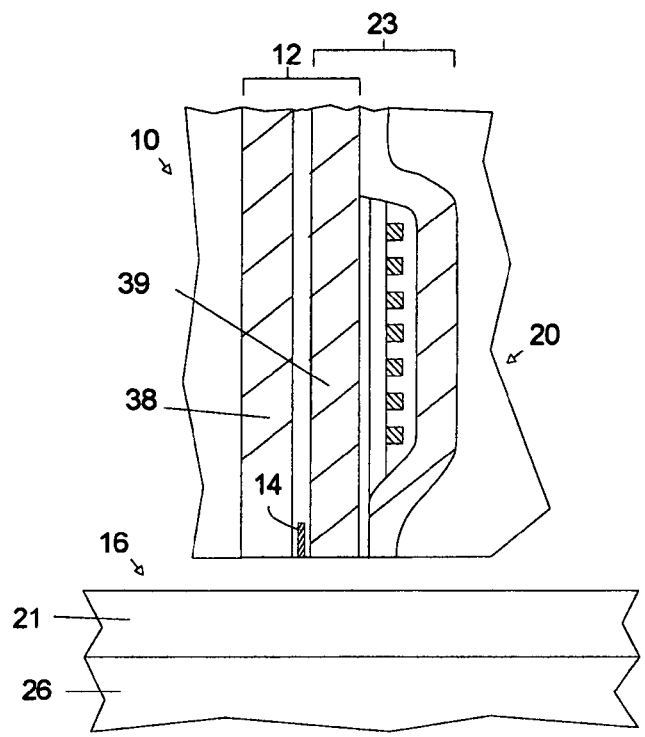
FIG. 1 is an illustration of a magnetic transducer and a magnetic disk used in a prior art data storage system.
Figure 2:
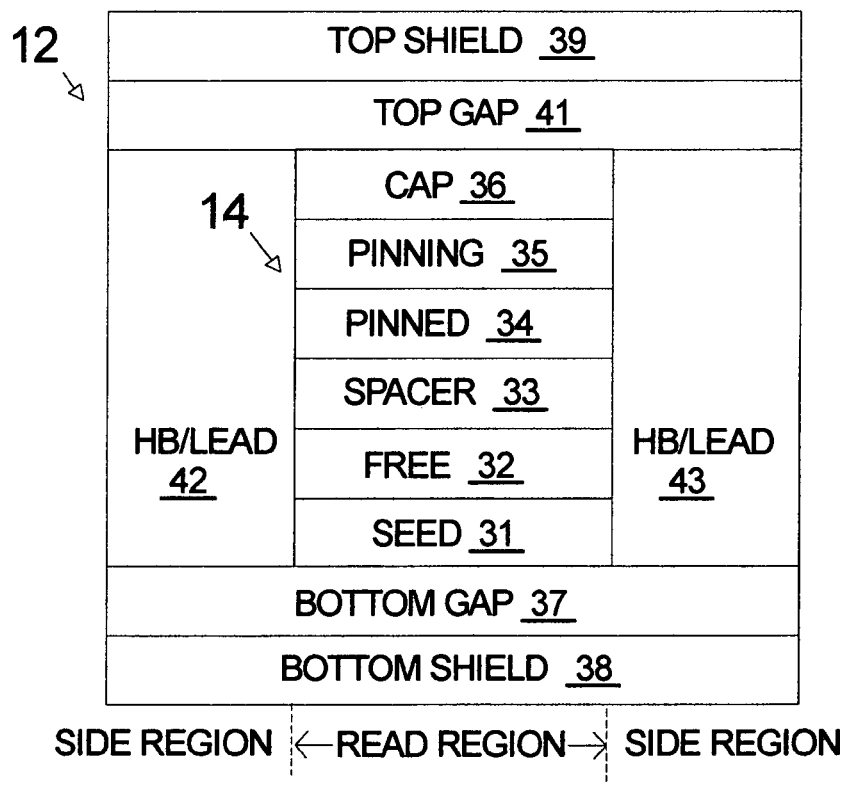
FIG. 2 is an illustration of a top-type GMR sensor as viewed parallel to an air bearing surface.
Figure 3:
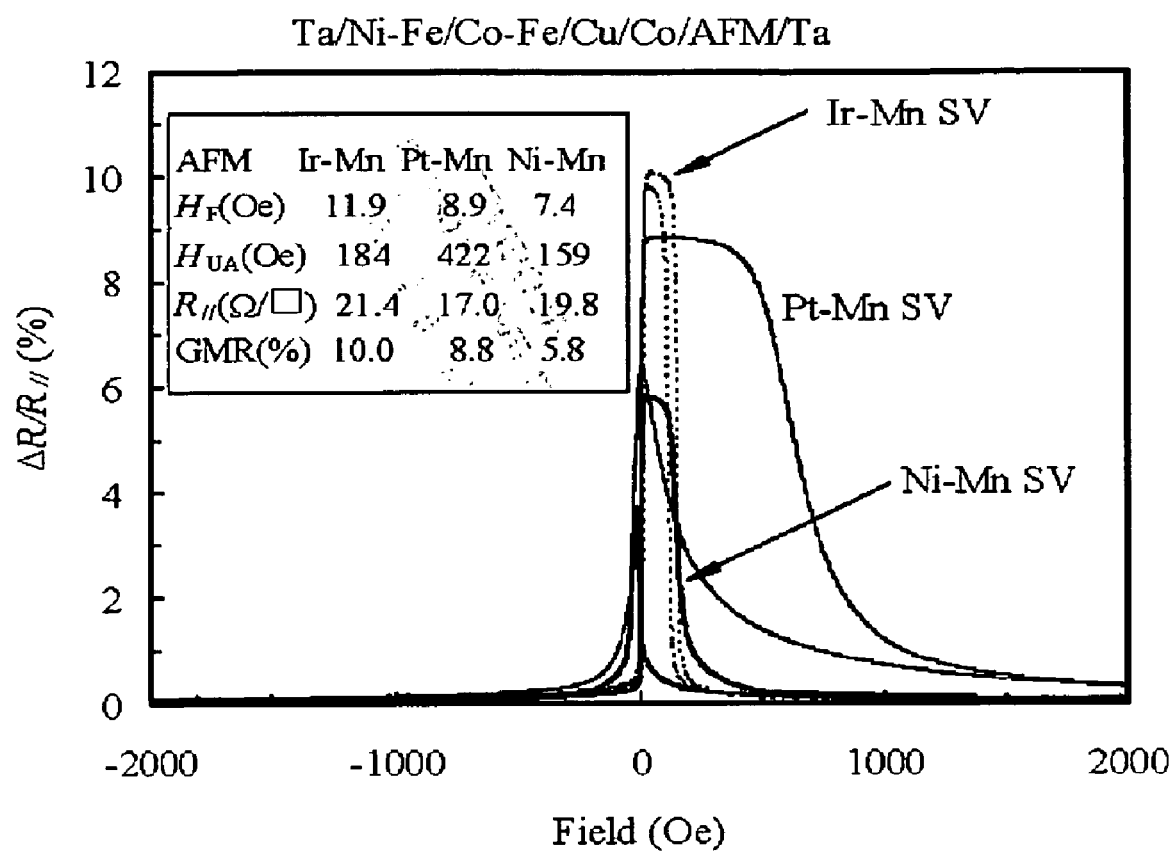
FIG. 3 is a graph of the easy-axis high-field MR responses of prior art GMR sensors comprising Ta(3)/Ni—Fe(4.5)/Co—Fe(0.6)/Cu(2.4)/Co(3.2)/Ir—Mn(7.5)/Ta(6), Ta(3)/Ni—Fe(4.5)/Co—Fe(0.6)/Cu(2.4)/Co(3.2)/Pt—Mn(25)/Ta(6) and Ta(3)/Ni—Fe(4.5)/Co—Fe(0.6)/Cu(2.4)/Co(3.2)/Ni—Mn(25)/Ta(6) films.
Figure 4:
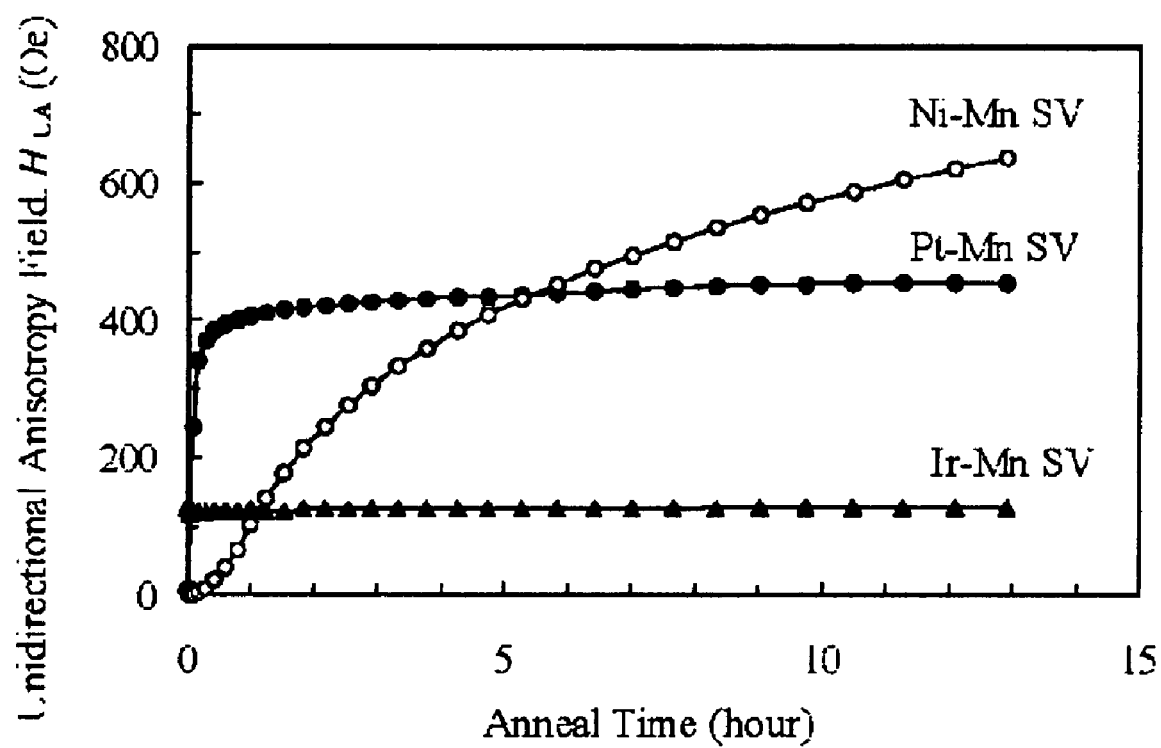
FIG. 4 is a graph of $H_{UA}$ versus anneal time at 280° C. for the prior art Ir—Mn, Pt—Mn and Ni—Mn GMR sensors.
Figure 5:
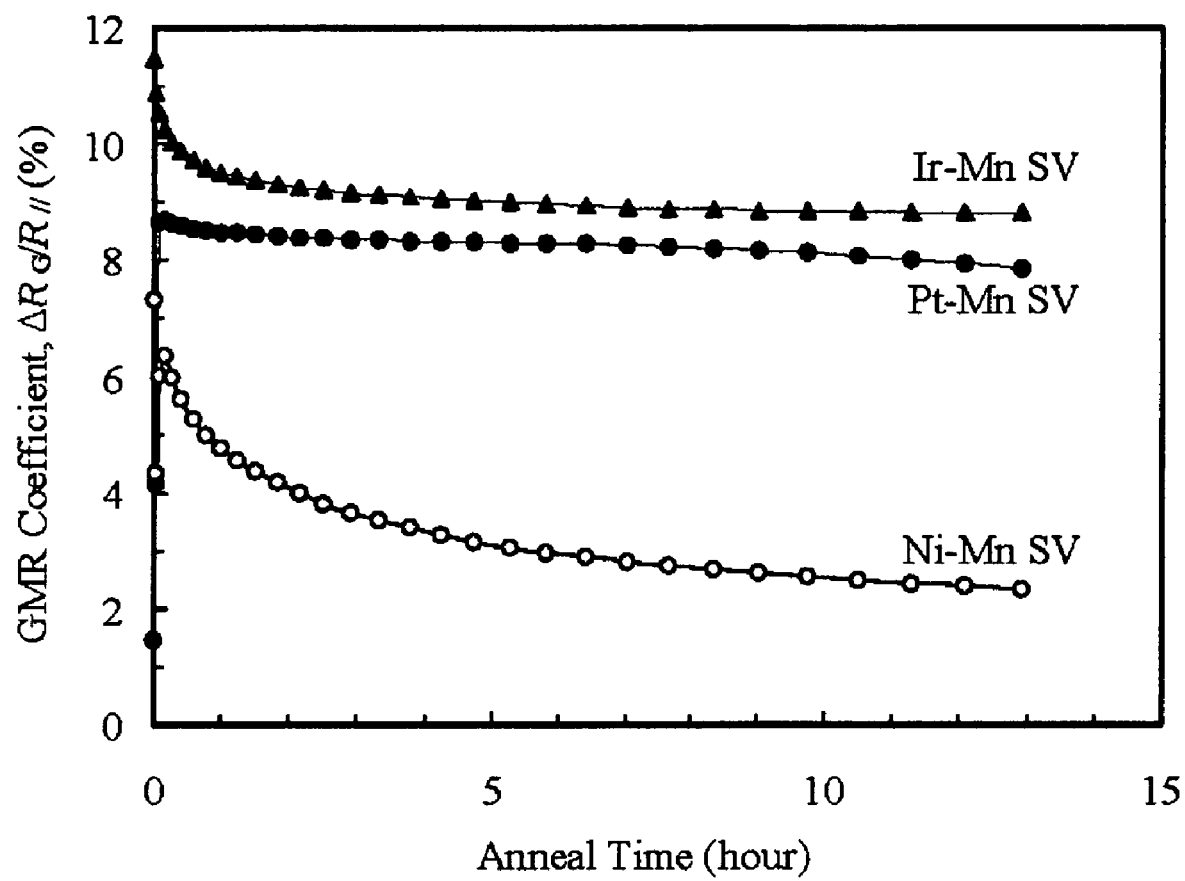
FIG. 5 is a graph of the GMR coefficient versus anneal time at 280° C. for the prior art Ir—Mn, Pt—Mn and Ni—Mn GMR sensors.
Figure 6:
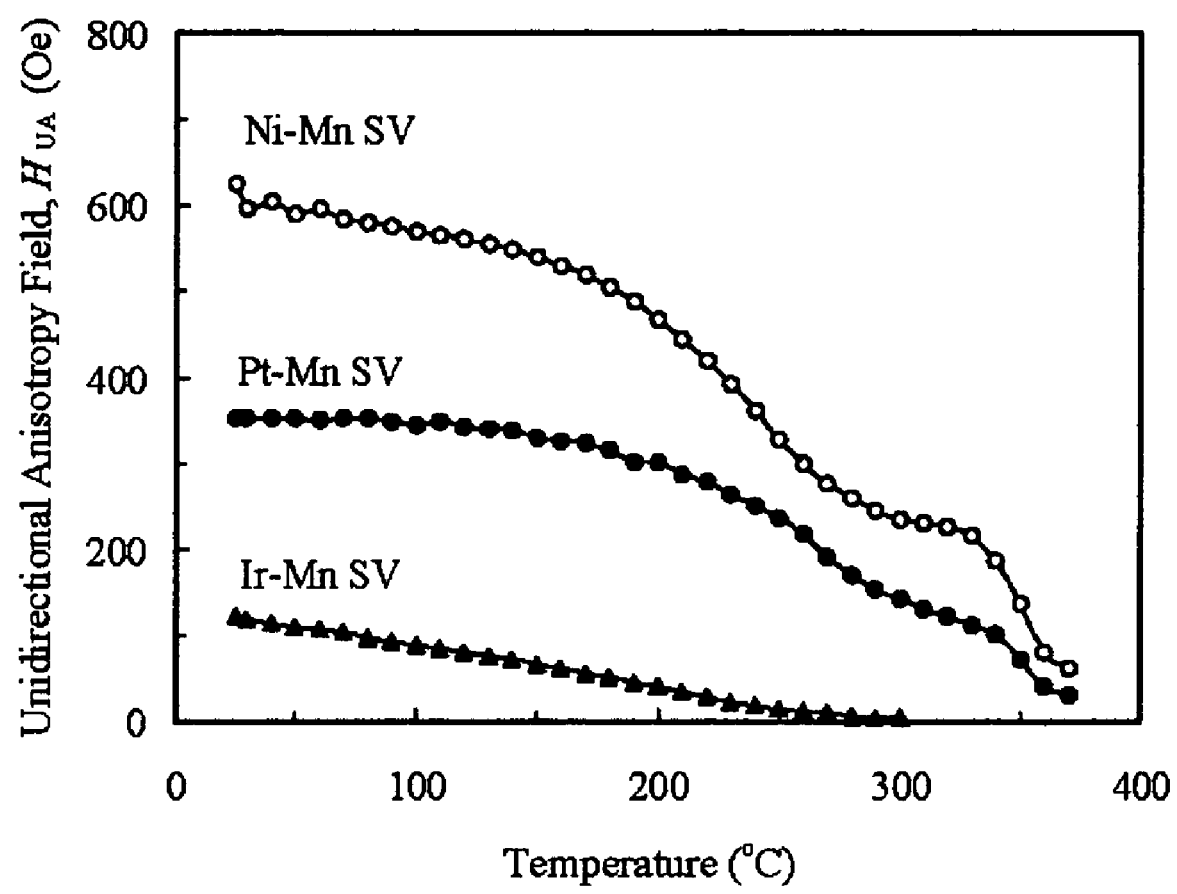
FIG. 6 is a graph of $H_{UA}$ versus temperature for the prior art Ir—Mn, Pt—Mn and Ni—Mn GMR sensors. The Ir—Mn, Pt—Mn and Ni—Mn GMR sensors exhibit $T_B$ (a blocking temperature, which $H_{UA}$ reaches 0) of 270, 370 and 380° C., respectively.
Figure 15:
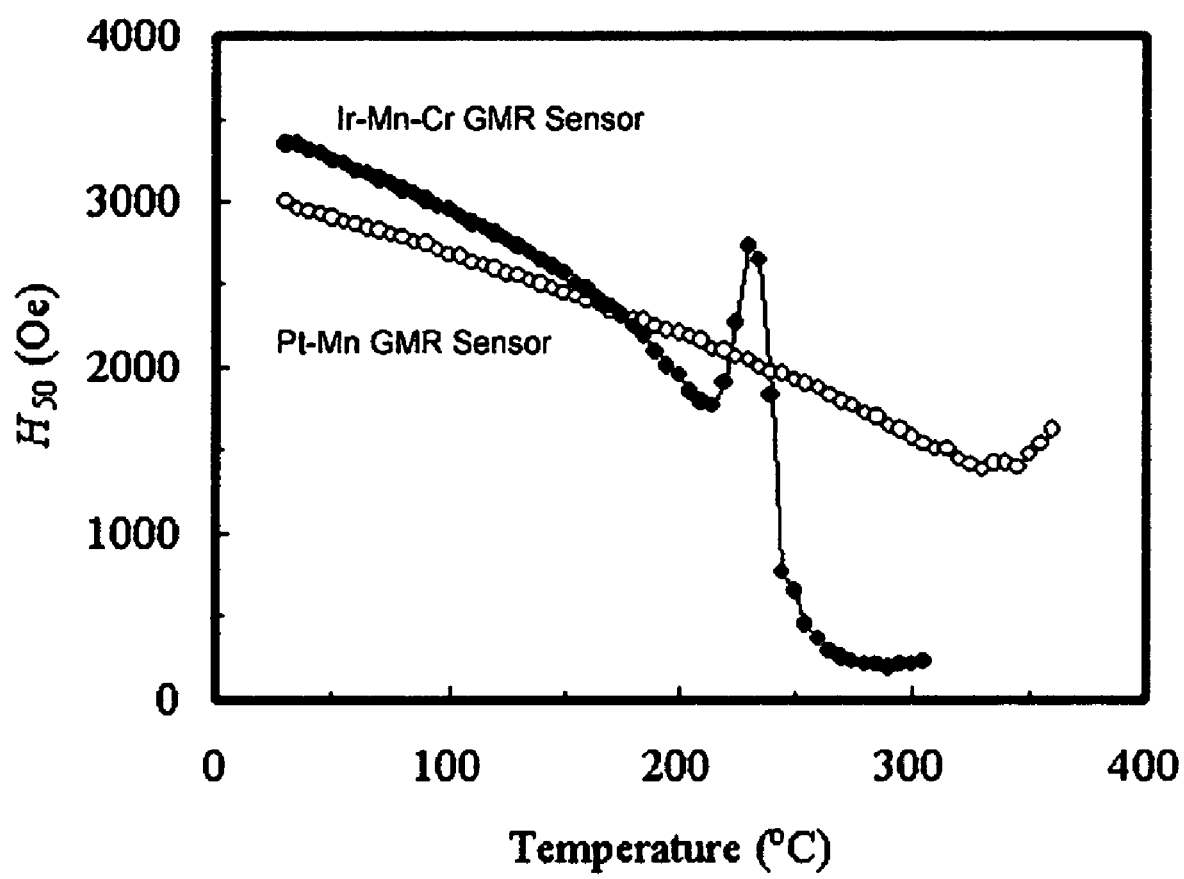
FIG. 15 is a chart showing $H_{50}$ versus temperature for an Ir—Mn—Cr GMR sensor comprising Al—O(3)/Ni—Cr—Fe(3.2)/Ni—Fe(0.4)/Ir—Mn—Cr(7.5)/77Co-23Fe(1.65)/Ru(0.8)/Co—Fe(1.6)/Cu—O(1.8)/Co—Fe(1)/Ni—Fe(1.6)/Ta(4) and a GMR sensor comprising Al—O(3)/Ni—Cr—Fe(3.2)/Ni—Fe(0.4)/Pt—Mn(15)/90Co-10Fe(1.6)/Ru(0.8)/Co—Fe(1.6)/Cu—O(1.8)/Co—Fe(1)/Ni—Fe(1.6)/Ta(4) films.

FIG. 15 shows $H_{50}$ versus temperature for an Ir—Mn—Cr GMR sensor comprising Al—O(3)/Ni—Cr—Fe(3.2)/Ni—Fe(0.4)/Ir—Mn—Cr(7.5)/77Co-23Fe(1.65)/Ru(0.8)/90Co-10Fe(1.6)/Cu—O(1.8)/Co—Fe(1)/Ni—Fe(1.6)/Ta(4) and a GMR sensor comprising Al—O(3)/Ni—Cr—Fe(3.2)/Ni—Fe(0.4)/Pt—Mn(15)/90Co-10Fe(1.6)/Ru(0.8)/90Co-10Fe(1.6)/Cu—O(1.8)/Co—Fe(1)/Ni—Fe(1.6)/Ta(4) films. When the Ir—Mn—Cr and Pt—Mn GMR sensors operate at 160° C., the $H_{UA}$ values are comparable and as high as 2,400 Oe. In contrast to FIGS. 6 and 9 which show that the thermal stability of the Ir—Mn pinning layer is lower than that of the Pt—Mn pinning layer, FIG. 15 shows that the thermal stability of the Ir—Mn—Cr pinning layer is comparable to that of the Pt—Mn pinning layer, mainly due to several merits as described in the preferred embodiments.

The Ir—Mn—Cr GMR sensor fabricated according to the invention shows better read performance than the Pt—Mn GMR sensor fabricated according to the prior art. For example, the Ir—Mn—Cr GMR sensor does not show negative signal amplitudes when it operates at up to 170 mV, while the Pt—Mn GMR sensor does not show negative signal amplitudes when it operates at up to 140 mV. Negative signal amplitudes are mainly caused by flipping of magnetizations of the Co—Fe/Ru/Co—Fe pinned-layer structure. Since the Co—Fe/Ru/Co—Fe pinned layers in the Ir—Mn—Cr GMR sensor shows much less coercivities than that in the Pt—Mn GMR sensor, irreversible hysteresis rotation caused by high coercivities does not occur, thus minimizing the flipping possibility of magnetizations of the Co—Fe/Ru/Co—Fe synthetic-pinned-layer structure in the Ir—Mn—Cr GMR sensor. This result indicates that the Ir—Mn—Cr GMR sensor in fact show a higher thermal stability than the Pt—Mn GMR sensor.

The compositions given herein have been described without regard to small amounts of impurities that are inevitably present in practical embodiments as is well known to those skilled in the art. Although the embodiments of the invention have been described in a particular GMR sensor environment, those skilled in the art will recognize that the invention may be used in other magnetic transducer configurations.

The invention claimed is:

1. A bottom-type giant magnetoresistance (GMR) sensor comprising:

a nonmagnetic Al—O first seed layer;
a nonmagnetic Ni—Cr—Fe second seed layer deposited on the first seed layer;
a ferromagnetic Ni—Fe third seed layer deposited on the second seed layer;
an antiferromagnetic Ir—Mn—Cr pinning layer deposited on the third seed layer;
a ferromagnetic Co—Fe first pinned layer deposited on the pinning layer;
a nonmagnetic Ru antiparallel (AP) spacer layer deposited on the first pinned layer;
a ferromagnetic Co—Fe second pinned layer deposited on the AP spacer layer;
a nonmagnetic Cu—O GMR spacer layer deposited on the second pinned layer;
a first free layer of ferromagnetic Co—Fe deposited on the GMR spacer layer;
a second free layer of ferromagnetic Ni—Fe deposited on the first free layer; and
a nonmagnetic Ta cap layer deposited above the first and second free layers;
wherein the first pinned layer comprises first and second Co—Fe films, the first Co—Fe film contacting the antiferromagnetic pinning layer and having an Fe content of approximately from 20 to 80 atomic percent, and the second Co—Fe film contacting the AP spacer layer and having an Fe content of approximately from 0 to 10 atomic percent.

2. The GMR sensor of claim 1 wherein the Co—Fe first free layer has an Fe content of approximately from 10 to 20 atomic percent, the Ni—Fe second free layer has an Fe content of approximately from 5-15 atomic percent, and the Co—Fe/Ni—Fe free layers have a nearly zero or negative saturation magnetostriction.

3. The GMR sensor of claim 1 wherein the antiferromagnetic Ir—Mn—Cr pinning layer has a Cr content of approximately from 1 to 10 atomic percent.

4. The GMR sensor of claim 1 wherein the antiferromagnetic Ir—Mn—Cr pinning layer has a Mn content of approximately from 70 to 80 atomic percent.

5. The GMR sensor of claim 1 wherein the first pinned layer has an Fe content of approximately from 20 to 80 atomic percent.

6. The GMR sensor of claim 1 wherein the second pinned layer has an Fe content of approximately from 0 to 10 atomic percent.

7. The GMR sensor of claim 1 wherein a net magnetic moment of the first and second pinned layers is approximately zero.

8. The GMR sensor of claim 1 wherein the first pinned layer has a higher positive saturation magnetostriction than the second pinned layer.

* * * * *